(12) United States Patent
Semnisky et al.

(10) Patent No.: US 12,365,035 B2
(45) Date of Patent: Jul. 22, 2025

(54) TOOL HOLDERS WITH FLUID DIRECTING PASSAGES

(71) Applicant: Kennametal Inc., Latrobe, PA (US)

(72) Inventors: Logan Semnisky, Greensburg, PA (US); Alan Bookheimer, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 670 days.

(21) Appl. No.: 17/555,000

(22) Filed: Dec. 17, 2021

(65) Prior Publication Data
US 2023/0191504 A1    Jun. 22, 2023

(51) Int. Cl.
*B23B 27/10* (2006.01)
*B23B 31/117* (2006.01)

(52) U.S. Cl.
CPC ........... *B23B 27/10* (2013.01); *B23B 31/1179* (2013.01); *B23B 2231/24* (2013.01); *B23B 2250/12* (2013.01); *Y10T 279/17111* (2015.01)

(58) Field of Classification Search
CPC . B23B 27/10; B23B 2231/24; B23B 2250/12; B23B 51/0684; B23B 51/0686; Y10T 279/17111
See application file for complete search history.

(56) References Cited

U.S. PATENT DOCUMENTS

| | | |
|---|---|---|
| 4,213,354 A | 7/1980 | Dahinden |
| 4,705,439 A | 11/1987 | Hoyle et al. |

(Continued)

FOREIGN PATENT DOCUMENTS

| | | |
|---|---|---|
| DE | 4326023 A1 | 3/1994 |
| DE | 10244759 | 4/2004 |

(Continued)

OTHER PUBLICATIONS

Mar. 22, 2017 Non-Final Office action (3 months) U.S. Appl. No. 14/669,298, 18 pages.

(Continued)

*Primary Examiner* — Eric A. Gates
*Assistant Examiner* — Eric Daniel Whitmire
(74) *Attorney, Agent, or Firm* — Christopher J. Owens

(57) ABSTRACT

A tool holder (e.g., shrink fit adapter) with fluid directing passages includes a shank and a fluid/coolant directing structure including one or more nozzles fluidically connected to feeder channels of the shank. The one or more nozzles each include an inner wall and an outer wall configured/shaped to direct fluid/coolant flow both radially inwardly and longitudinally distally and/or to variably modulate fluid/coolant flow around a nozzle outlet of or provided by the nozzle(s) in relation to a longitudinal central axis of the shank. The fluid/coolant directing structure incorporates one of more of: a ring of peripherally located nozzles having geometries/orientations configured to focus and direct thin sheets of fluid/coolant both radially inwardly and distally longitudinally; manifolds for directly feeding nozzle inlets of distally located nozzles; and a nozzle provided by approximately sinusoidally varying surfaces circumferentially disposed about a tool receiving recess of the tool holder for correspondingly variably modulating fluid/coolant flow direction through and exiting from the nozzle.

13 Claims, 23 Drawing Sheets

(56) References Cited

U.S. PATENT DOCUMENTS

| | | | |
|---|---|---|---|
| 4,795,292 | A | 1/1989 | Dye |
| 5,358,360 | A | 10/1994 | Mai |
| 5,405,155 | A | 4/1995 | Kanaan et al. |
| 5,947,657 | A | 9/1999 | Lipohar et al. |
| 6,135,679 | A | 10/2000 | Kazda |
| 7,785,046 | B2 | 8/2010 | Beckington |
| 8,337,125 | B2 | 12/2012 | Pigernes et al. |
| 9,616,541 | B2 | 4/2017 | Haimer et al. |
| 10,160,042 | B2 | 12/2018 | Borapura |
| 2004/0013480 | A1 | 1/2004 | Beckington |
| 2007/0077132 | A1 | 4/2007 | Beckington |
| 2007/0252344 | A1 | 11/2007 | Retzbach |
| 2010/0270757 | A1* | 10/2010 | Beckington ......... B23B 31/1179 279/20 |
| 2011/0103902 | A1 | 5/2011 | Erickson et al. |
| 2011/0318123 | A1 | 12/2011 | Leishman et al. |
| 2012/0308323 | A1 | 12/2012 | Gardner et al. |
| 2014/0353931 | A1 | 12/2014 | Frota De Souza Filho et al. |
| 2015/0042050 | A1 | 2/2015 | Haimer et al. |
| 2015/0367423 | A1 | 12/2015 | Voss |
| 2016/0368064 | A1 | 12/2016 | Boregowda et al. |
| 2019/0344360 | A1 | 11/2019 | Haimer |

FOREIGN PATENT DOCUMENTS

| | | |
|---|---|---|
| DE | 102008060374 A1 | 3/2010 |
| DE | 202011004231 U1 | 8/2011 |
| DE | 202012104969 U1 | 2/2013 |
| DE | 102012101672 A1 | 8/2013 |
| DE | 202013104099 U1 | 9/2013 |
| DE | 102013203558 A1 | 9/2014 |
| JP | H05329705 A | 12/1993 |
| JP | 2002036063 | 2/2002 |
| JP | 2002192441 A | 7/2002 |
| JP | 2003266274 A | 9/2003 |
| JP | 2004351552 A | 12/2004 |
| JP | 2014231140 A | 12/2014 |
| WO | 2010062850 | 6/2010 |
| WO | 2011138360 | 11/2011 |
| WO | 2015107101 | 7/2015 |
| WO | 2017009328 | 1/2017 |
| WO | 2021048267 | 3/2021 |

OTHER PUBLICATIONS

May 15, 2017 Office action (3 months) U.S. Appl. No. 15/256,803, 14 pages.

Oct. 6, 2017 Final Rejection U.S. Appl. No. 14/669,298, 15 Pages.

Jan. 4, 2018 Non-Final Office action (3 months) 2 for U.S. Appl. No. 15/256,803, 21 Pages.

Jan. 9, 2018 Advisory Action (PTOL-303) 1 for U.S. Appl. No. 14/669,298, U.S. Pat. No. 10/160,042, 4 Pages.

Mar. 9, 2018 Non-Final Office action (3 months) 2 for U.S. Appl. No. 14/669,298, 12 Pages.

Jun. 18, 2018 Final Office Action U.S. Appl. No. 15/256,803, 15 Pages.

Aug. 16, 2018 Notice of Allowance U.S. Appl. No. 14/669,298 (U.S. Pat. No. 10/160,042), 12 Pages.

Nov. 23, 2018 Notice of Allowance U.S. Appl. No. 15/256,803 (U.S. Pat. No. 10/252,346), 8 Pages.

Apr. 30, 2020 Advisory Action (PTOL-303) U.S. Appl. No. 16/008,693 3 pages.

Oct. 13, 2020 Indian Office Action (Non-US) IN Application No. 1800/CHE/2014, 6 Pages.

Feb. 15, 2022 Indian Office Action (Non-US) IN Application No. 201743000891, 8 Pages.

Oct. 12, 2022 Foreign Office Action German Application No. 102015105047.1, 10 pages.

Swiss Precision Tools: "HS Hydraulic Reduction Sleeves," COL1125, Sep. 2013, pp. 16-17.

Jul. 24, 2024 Foreign Office Action German Application No. DE102022129802.7, 08 pages.

Sep. 26, 2024 Foreign Office Action Chinese Application No. CN2022115618425, 02 pages.

* cited by examiner

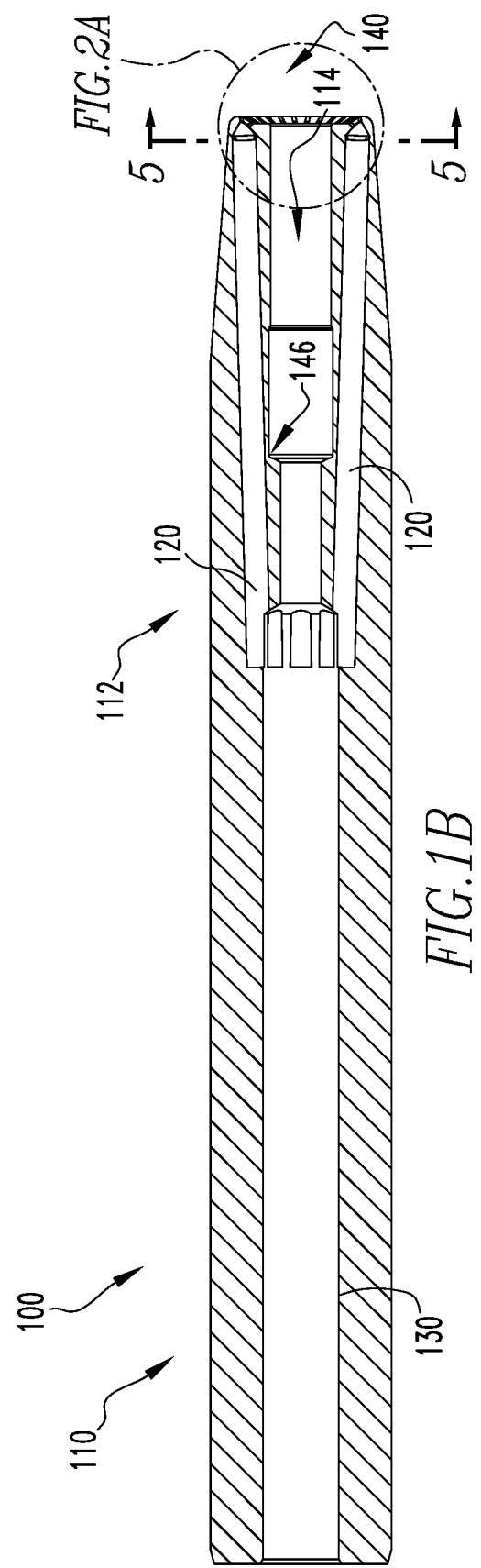

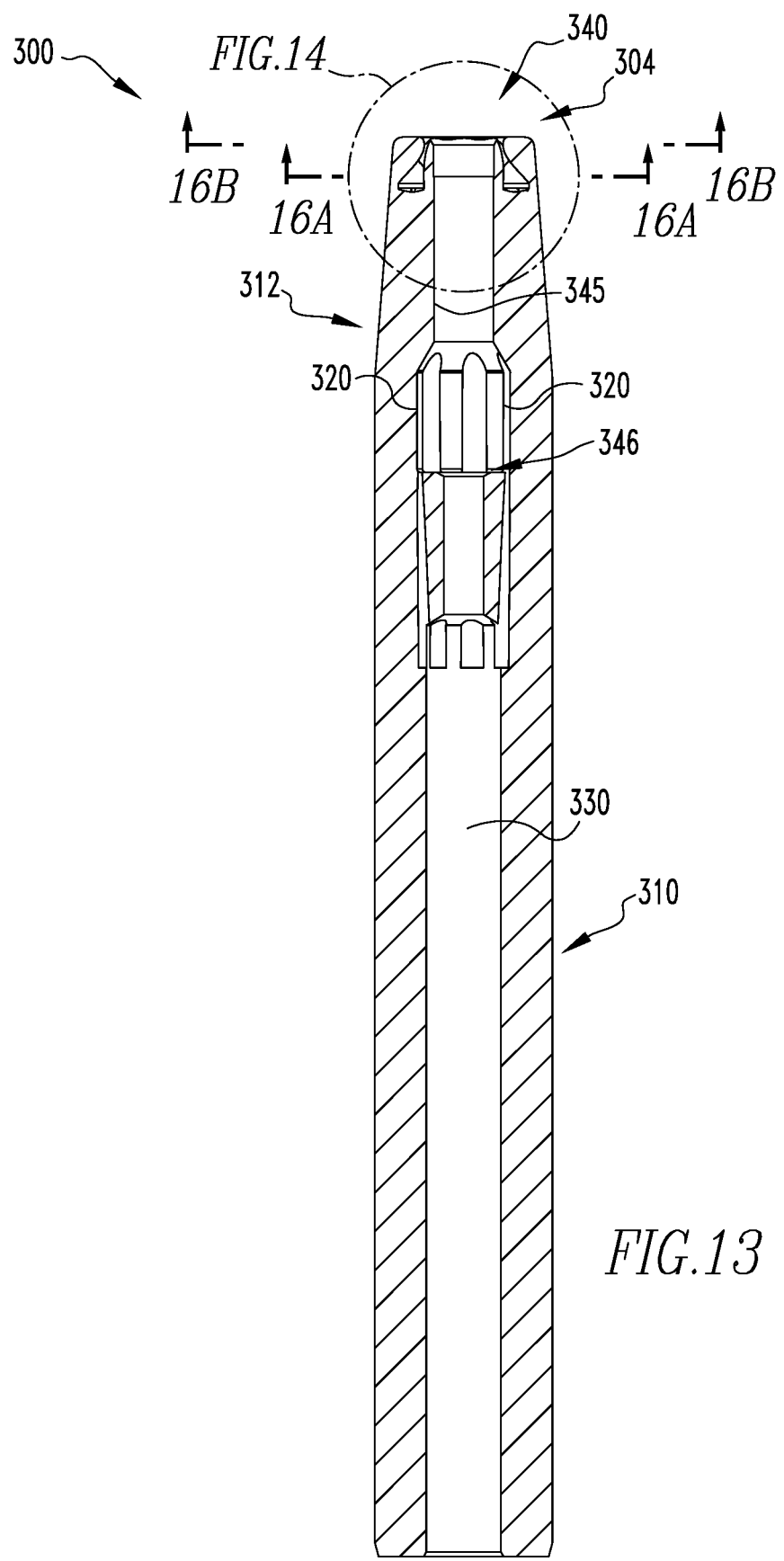

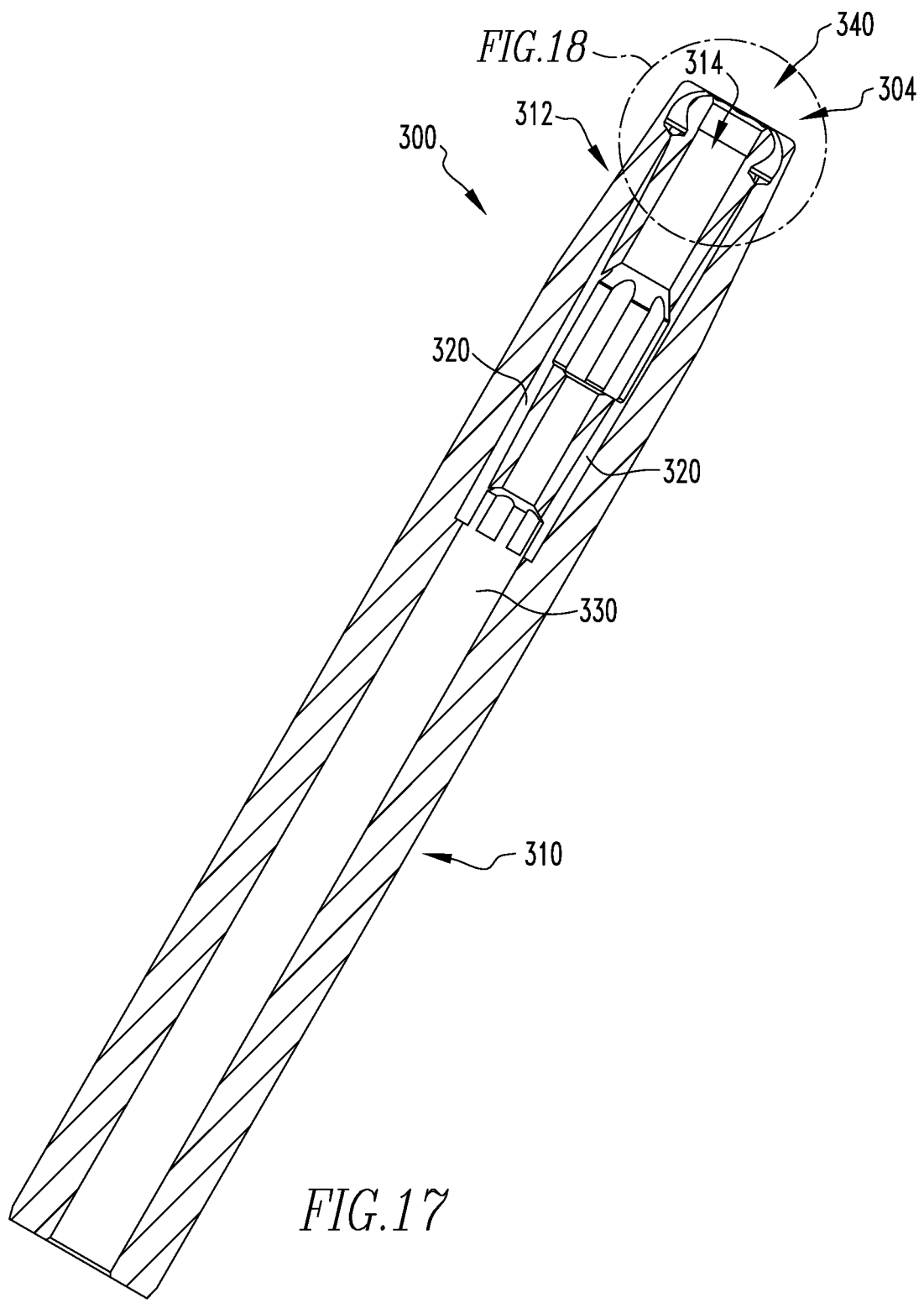

TOOL HOLDERS WITH FLUID DIRECTING PASSAGES

FIELD OF THE INVENTION

The present invention involves rotatable cutting tools, and more particularly relates to tool holders, such as a shrink fit adapter or other tool holder (adapter), including a tool receiving recess (end/bore) that receives and holds a cutting tool therein and a fluid/coolant directing structure thereabout including one or more nozzles configured/shaped to focus and direct fluid/coolant flow both radially inwardly and longitudinally(/axially) distally incident upon the cutting tool including its cutting tip.

BACKGROUND INFORMATION

Tool holders typically do not have good coolant capability and a majority of solid carbide tools are not "through coolant", i.e., configured to facilitate directing fluid/coolant at the cutting tool when it is in use, due to the difficulty of manufacturing fluid/coolant holes in carbide tools. In addition, it is difficult to get fluid/coolant to the cutting edge of solid carbide tools through the adapter holding the tool because the high rotational speeds cause the fluid/coolant to "fan out" radially away from the tool due to centrifugal force(s), that is, the inertial force caused by rotation of the tool directing the fluid/coolant away from the axis of rotation of the tool.

It would be helpful to be able to more effectively direct fluid/coolant at such tools during use and especially at high rotational speeds.

It would be helpful to be able to provide a fluid/coolant directing structure configured to focus and/or direct fluid/coolant flow incident upon a cutting tool including its cutting tip during use/rotation of the tool and especially at high rotational speeds.

It would be helpful to be able to provide a fluid/coolant directing structure suitable for use with a variety of different tools inclusive of tools varying in length.

It would be helpful to be able to provide such a fluid/coolant directing structure as part of a tool holder (e.g., a shrink fit adapter) configured to hold the tool during use/rotation of the tool and especially at high rotational speeds.

It would be helpful to be able to provide a fluid/coolant directing structure that is fluidically connected with fluid/coolant feeder structures/interfaces of a shank, holder, adapter or other object configured to hold the tool.

It would be helpful to be able to provide a fluid/coolant directing structure that controls focus and/or directionality of fluid/coolant flow in accommodation of tools of various sizes/shapes and/or custom or complex tool cooling requirements.

It would be helpful to be able to provide a shrink fit adapter or other tool holder incorporating such a fluid/coolant directing structure.

It would be helpful to be able to provide such a fluid/coolant directing structure that is readily manufacturable (e.g., utilizing a 3D printing process, additive/subtractive manufacturing technologies, etc.).

It would be helpful to be able to provide (build) such a fluid/coolant directing structure at a distal end of a shank that includes a holder for the tool (e.g., a shrink fit adapter).

SUMMARY OF THE INVENTION

Tool holders (e.g., shrink fit adapters or other tool holders/adapters) with fluid directing passages include a shank and a fluid/coolant directing structure including one or more nozzles fluidically connected to feeder channels of the shank. The one or more nozzles each include an inner wall and an outer wall configured/shaped to direct fluid/coolant flow both radially inwardly and longitudinally distally and/or to variably modulate fluid/coolant flow around a nozzle outlet of or provided by the nozzle(s) in relation to a longitudinal central axis of the shank. The fluid/coolant directing structure incorporates one of more of: a ring of peripherally located nozzles having geometries/orientations configured to focus and direct thin sheets of fluid/coolant both radially inwardly and distally longitudinally(/axially); manifolds for directly feeding nozzle inlets of nozzles at a distal portion of the fluid/coolant directing structure; and approximately sinusoidally varying surfaces circumferentially disposed about a tool receiving recess of the tool holder for correspondingly variably modulating fluid/coolant flow around a nozzle outlet at a distal portion of the fluid/coolant directing structure.

An aspect of the invention is to provide a tool holder with fluid directing passages, the tool holder comprising: a shank including a distal portion having feeder channels, the shank including one or more coolant inlets with which the feeder channels are fluidically connected, the distal portion including a tool receiving recess configured/sized to receive a cutting tool therein and including a tool coupling interface portion; and a fluid/coolant directing structure coupled to the distal portion, the fluid/coolant directing structure including a fluid/coolant chamber fluidically connected to and distally positioned in relation to the feeder channels, at least one nozzle fluidically connected to the fluid/coolant chamber and an angled annular surface at a distal end of the tool holder, the nozzle(s) each facing and being configured/shaped to focus and direct fluid/coolant flow that is both radially inwardly and longitudinally distally directed in relation to a longitudinal central axis of the shank.

In an example embodiment, the fluid/coolant directing structure includes a plurality of manifolds fluidically connected to and distally positioned in relation to the feeder channels, the nozzle(s) being fluidically connected to the manifolds and the angled annular surface at a distal end of the tool holder, the manifolds each having a manifold inlet channel and a plurality of manifold outlet channels configured to substantially evenly distribute/divide fluid/coolant flow from the manifold inlet channel as between the manifold outlet channels.

An aspect of the invention is to provide a tool holder with fluid directing passages, the tool holder comprising: a shank including a distal portion and one or more coolant inlets along the shank, the coolant inlets including feeder channels at the distal portion, the distal portion including a tool receiving recess configured/sized to receive a cutting tool therein and including a tool coupling interface portion; and a fluid/coolant directing structure coupled to the distal portion, the fluid/coolant directing structure including a fluid/coolant chamber fluidically connected to and distally positioned in relation to the feeder channels, a nozzle fluidically connected to the fluid/coolant chamber and a generally ring-shaped nozzle outlet at a distal end of the tool holder, the nozzle outlet approximately varying sinusoidally in position circumferentially along inner and outer edges thereof in relation to a longitudinal central axis of the shank and the fluid/coolant chamber being configured/shaped to correspondingly variably modulate and direct fluid/coolant flow through and exiting from the nozzle outlet that is both radially inwardly and longitudinally distally directed in relation to the longitudinal central axis.

BRIEF DESCRIPTION OF THE DRAWINGS

FIG. 1B is a cross-sectional elevation view (taken through line 1B-1B of FIG. 4) of the tool holder with fluid directing passages of FIG. 1A;

FIG. 13 is a cross-sectional elevation view (taken through line 13-13 of FIG. 12B) of the example embodiment of a tool holder with fluid directing passages including a fluid/coolant directing structure inclusive of portions of the fluid/coolant chamber configured/shaped to direct fluid/coolant flow that is predominantly longitudinally distally directed in relation to the longitudinal central axis;

FIG. 17 is a cross-sectional elevation view (taken through line 17-17 of FIG. 12B) of the example embodiment of a tool holder with fluid directing passages including a fluid/coolant directing structure inclusive of portions of the fluid/coolant chamber configured/shaped to direct fluid/coolant flow that is predominantly radially inwardly directed in relation to the longitudinal central axis.

DETAILED DESCRIPTION

Figure 1A:
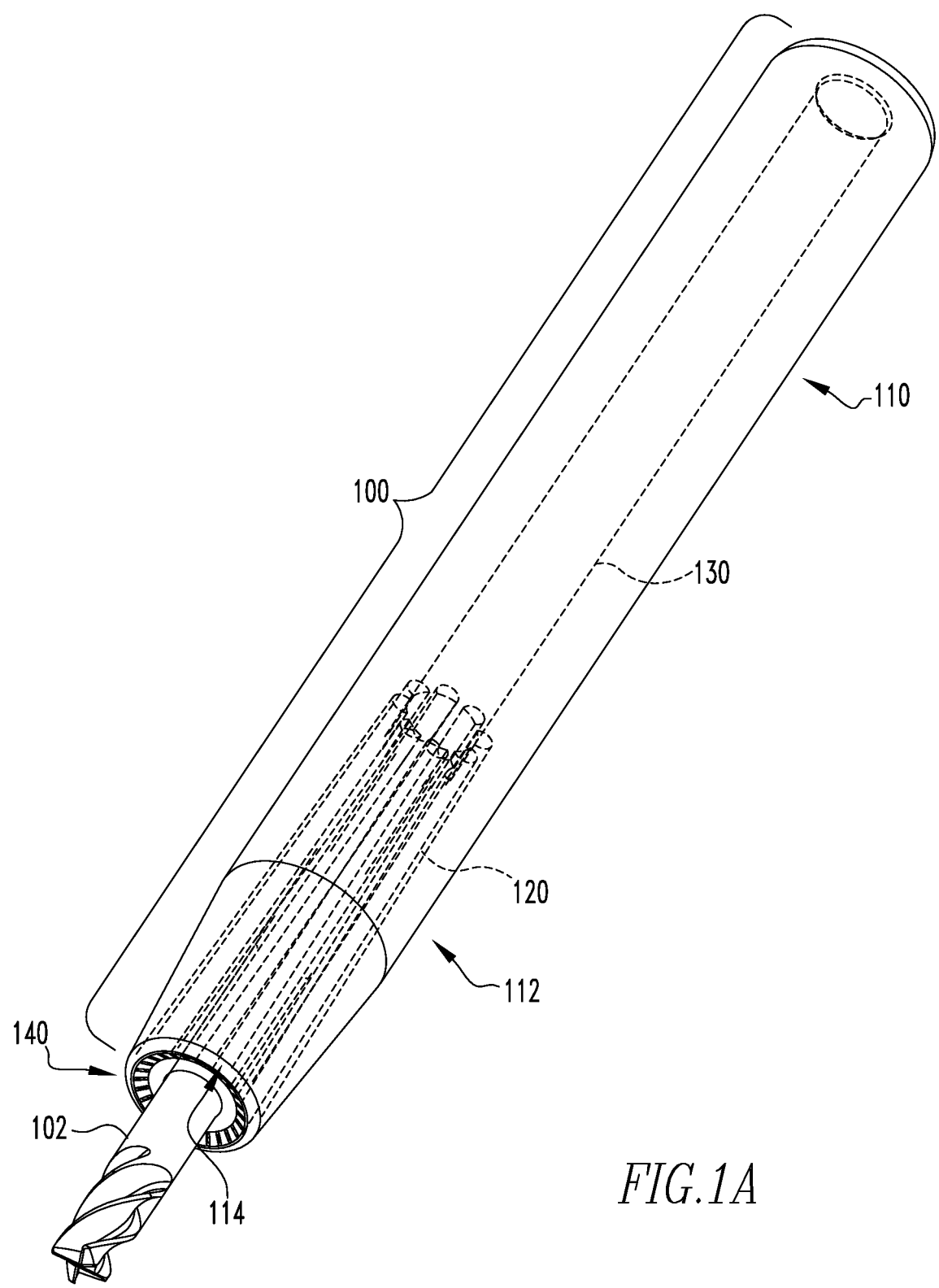
FIG. 1A is a perspective view of an example embodiment of a tool holder with fluid directing passages, the tool holder including a shank (with a distal portion and internal feeder channels) and a fluid/coolant directing structure (inclusive of nozzles at an angled annular surface of the structure) coupled to the distal portion—an exterior portion of the shank being depicted as invisible in this view such that portions of the feeder channels can be seen.

With reference to FIGS. 1A-5, an example embodiment of a tool holder 100 with fluid directing passages is shown and described herein. The tool holder 100 includes a shank and a fluid/coolant directing structure including a ring of peripherally located nozzles at a distal end of the adapter, the nozzles having geometries/orientations configured to focus and direct thin sheets of fluid/coolant both radially inwardly and distally longitudinally (in relation to a central longitudinal axis of the tool holder) incident upon the cutting tool including a cutting tip thereof With reference to FIGS. 6-11, another example embodiment of a tool holder 200 with fluid directing passages is shown and described herein. The tool holder 200 includes a shank and a fluid/coolant directing structure incorporating an arrangement of manifolds directly feeding inlets of nozzles (e.g., of a ring-like arrangement of the aforementioned nozzles).

With reference to FIGS. 12A-18, another example embodiment of a tool holder 300 with fluid directing passages is shown and described herein. The tool holder 300 includes a shank and a fluid/coolant directing structure incorporating (approximately) sinusoidally varying surfaces of a single nozzle outlet circumferentially disposed about a tool (held by the adapter) to correspondingly variably modulate fluid/coolant flow and direct fluid/coolant flow that is both radially inwardly and longitudinally distally directed (in relation to a central longitudinal axis of the tool holder) incident upon the cutting tool including a cutting tip thereof.

Cutting tool assemblies, cutting tools and components thereof, such as described herein, are applicable to cutting operations and devices, such as for example: milling (e.g., solid carbide end milling), holemaking, tooling systems, (shrink fit) tool holders/adapters and components thereof (e.g., shanks and fluid/coolant directing structures incorporated into / coupled to the shank, and cutting tools securable within or held by a tool receiving recess or other portion of the shank).

In one aspect, structures, features and/or functionalities of the tool holders described/depicted herein (and various combinations thereof) are applicable, more generally, to tool holders/adapters and components thereof. The structures embodied in the tool holders described/depicted herein are applicable, more generally, to milling, holemaking, drilling and tooling systems. Additionally, it should be appreciated that the technologies described herein are also generally adaptable as or in relation to cutting tool assemblies to benefit from and/or incorporate fluid/coolant directing structures or features thereof as further described herein.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", is not to be limited to the precise value specified. In at least some instances, the approximating language may correspond to the precision of an instrument for measuring the value. Herein and throughout the specification and claims, range limitations may be combined and/or interchanged, such ranges are identified and include all the sub-ranges contained therein unless context or language indicates otherwise.

With reference to FIGS. 1A-5, in this example embodiment, the tool holder 100 includes a shank 110 (including a distal portion 112 having feeder channels 120) and a fluid/coolant directing structure 140 provided (e.g., built utilizing a 3D printing process) at a distal/distally-facing portion of the shank. Thusly, and as further discussed below, the fluid/coolant directing structure 140 is (connected/)coupled to the distal portion 112. The distal portion 112 of the shank includes feeder channels 120 (e.g., eight feeder channels equally spaced thereabout).

Figure 2A:
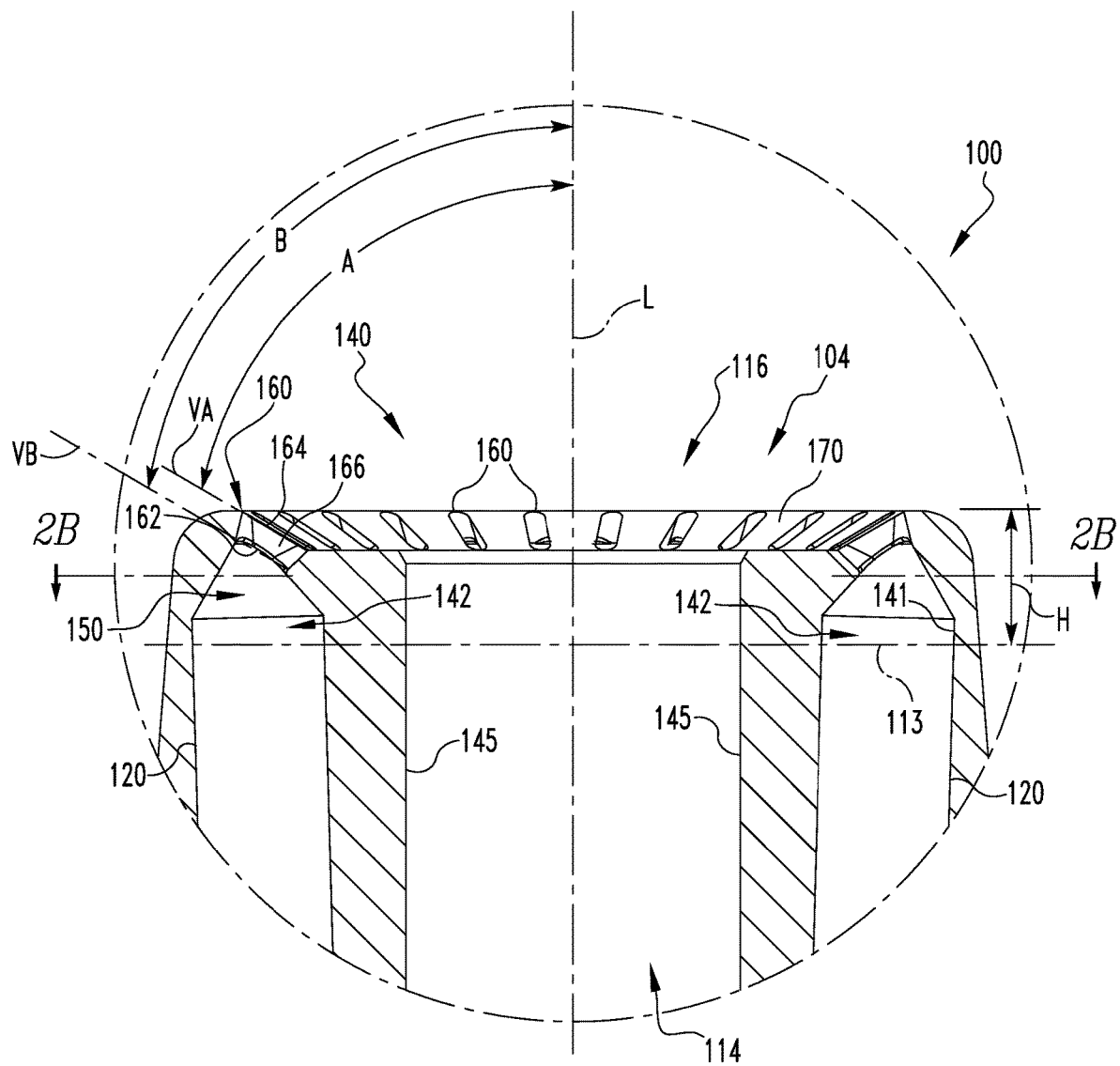
FIG. 2A is an enlarged cross-sectional view of the tool holder (at the circular region denoted by line 2A of FIG. 1B) showing portions of the fluid/coolant directing structure inclusive of the nozzles at the angled annular surface of the structure.
Figure 2B:
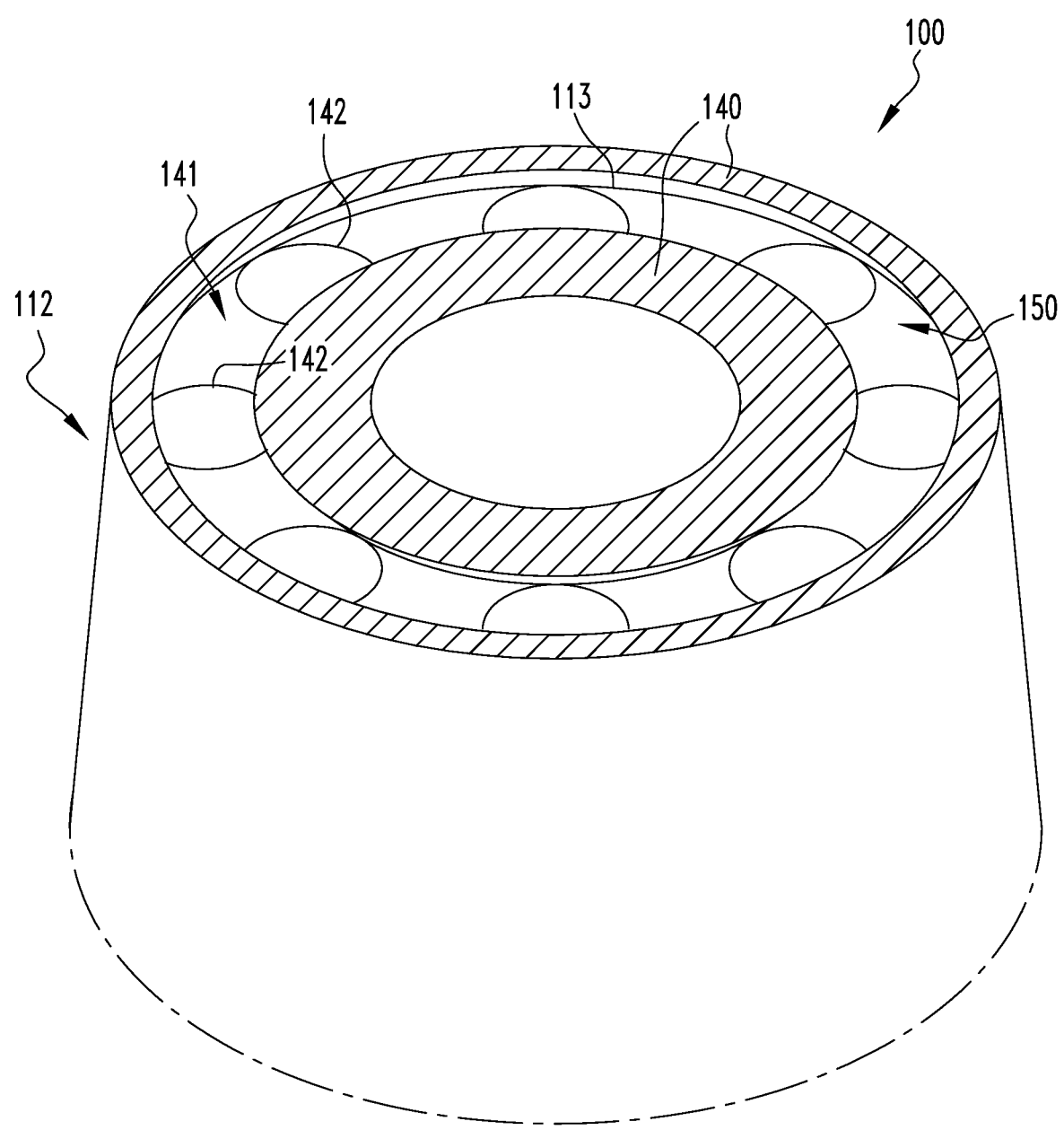
FIG. 2B is a cross-sectional perspective view of the tool holder (taken through line 2B-2B of FIG. 2A) showing a fluid/coolant chamber (of the fluid/coolant directing structure) fluidically connected to and distally positioned in relation to the feeder channels.

Referring to FIGS. 2A and 2B, in example embodiments, the tool holder 100 further includes a structure 141 at a distally-facing surface 113 of the shank 110. The structure 141 has openings 142 fluidically connected (e.g., overlaying and coaligned as shown) with the feeder channels 120, and the fluid/coolant directing structure 140 is formed/built upon the structure 141 (e.g., utilizing a 3D printing process). The fluid/coolant directing structure 140 includes a fluid/coolant chamber 150 (FIG. 2B), which is fluidically connected to and distally positioned in relation to the feeder channels 120. By way of example (and referring to FIG. 2A), the fluid/coolant directing structure 140 has a build height (denoted "H"), from the distally-facing surface 113 to the distal-most end of the periphery portion 116, of approximately 1.98 mm (e.g., an approximately 2 mm build height on an adapter configured/sized to receive tool shanks having a diameter of 6.35 mm). In this illustrated example embodiment, the fluid/coolant directing structure 140 is configured/formed such that the fluid/coolant chamber 150 is a (self-supporting) revolved chamber for pressurized fluid/coolant (e.g., a revolved chamber formed/shaped as shown providing a continuous reservoir extending circumferentially around the fluid/coolant directing structure 140). The fluid/coolant directing structure 140 also includes an angled annular surface 170 (FIG. 2A) positioned (e.g., circumferentially/concentrically positioned) about a tool receiving recess 114. The angled annular surface 170 inclusive of/defining at least one nozzle or a plurality of nozzles is further discussed below.

In example embodiments, the fluid/coolant directing structure 140 is generally disk-shaped or ring-shaped and the angled annular surface 170 thereof is formed with nozzles 160 (e.g., a series of nozzles equidistantly distributed along/around the angled annular surface 170 as shown, or circumferentially about the central rotational axis of the tool). In example embodiments, the fluid/coolant chamber 150 and the nozzles 160 are integrally formed or otherwise formed or connected together providing the fluid/coolant directing structure 140. In example embodiments, the fluid/coolant directing structure 140 and/or at least a portion of the tool holder 100 includes material from or in the form of one or more 3D printed objects. In example embodiments, the entirety of the tool holder 100, or a portion thereof, is manufactured utilizing a 3D printing, machining, casting or other process.

With reference to FIG. 1B, the shank 110 includes one or more fluid/coolant inlets 130 with which the feeder channels 120 are fluidically connected, the distal portion 112 including a tool receiving recess (end/bore) 114 configured/sized to receive a cutting tool 102 therein and including a tool coupling interface portion 145 and a tool seat 146 of the adapter. The tool coupling interface portion 145 is, for example, a cylindrical bore precisely machined to be provided with an ambient temperature inner diameter sized sufficiently smaller than an ambient temperature outer diameter of the cutting tool in order for the interface portion 145 to serve as a shrink fit adapter which, upon being heated, expands a sufficient amount to receive the cutting tool therein and thereafter, after its temperature is lowered, radially inwardly contracts essentially fusing the tool and interface portion together thereby providing the shrink fit—the aforementioned basic operational features/functionalities of shrink fit adapters being understood by those of skill in the art.

Figure 3A:
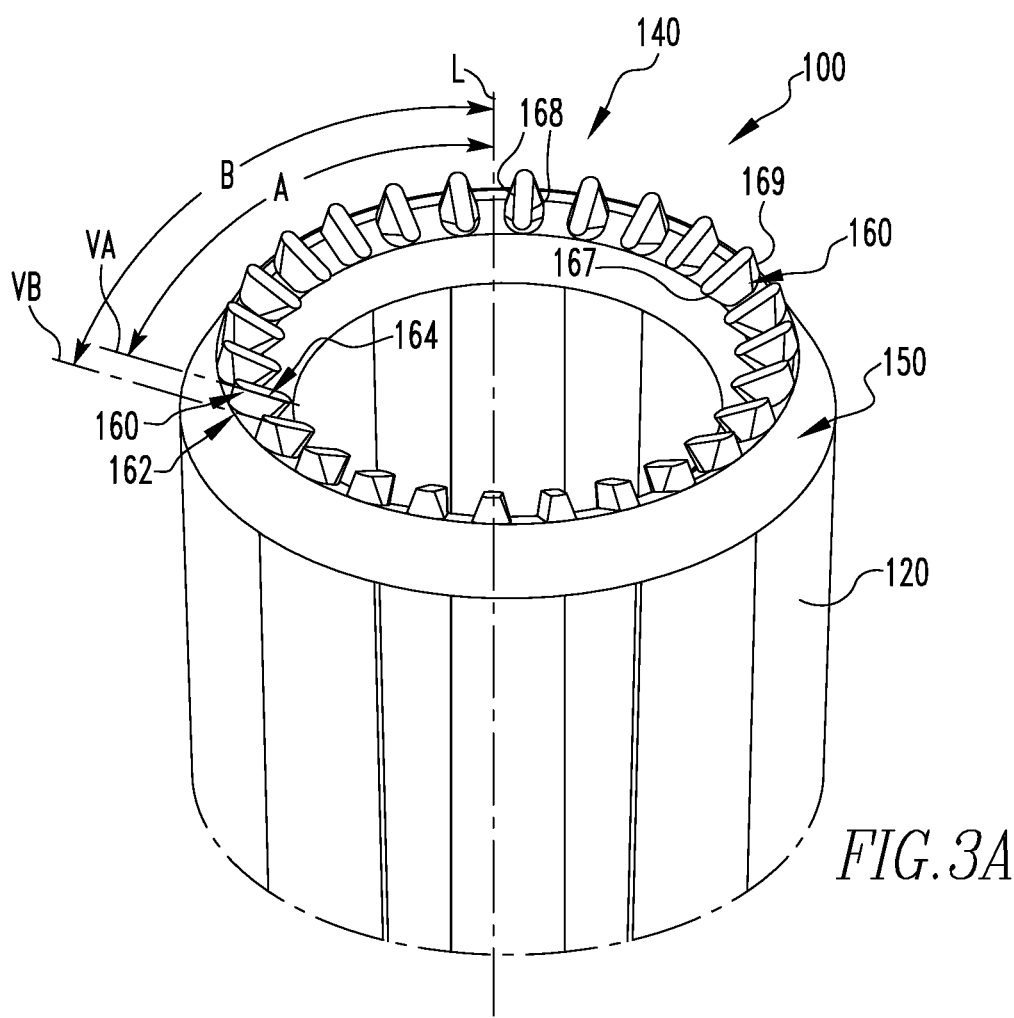
FIG. 3A is a perspective view of a distal portion of the tool holder of FIG. 1A—an exterior portion of the tool holder being depicted as invisible in this view such that portions of the fluid/coolant directing structure (inclusive of the nozzles at the angled annular surface of the structure) and the feeder channels can be seen.
Figure 3B:
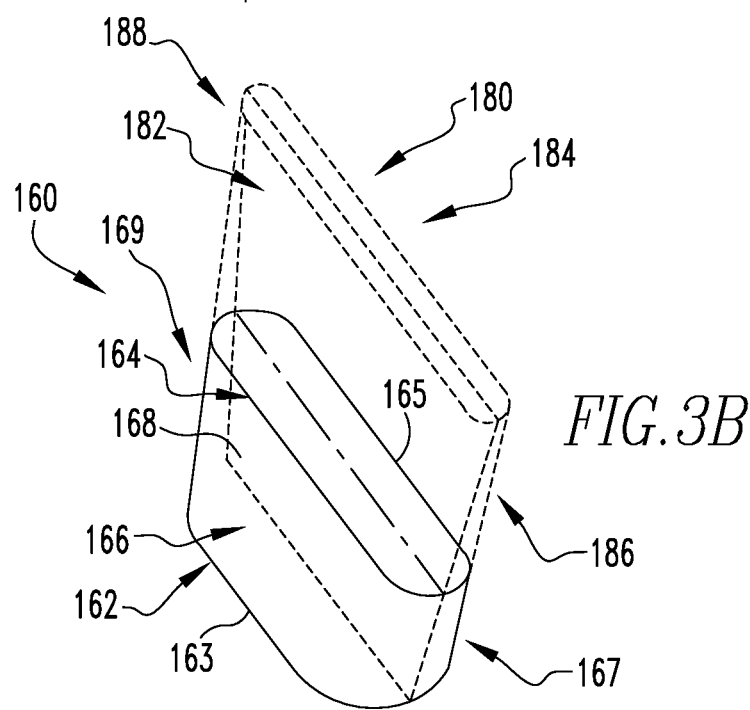
FIG. 3B is a pictorial representation of an example configuration/shape of a nozzle channel of the fluid/coolant directing structure, also showing (in dashed lines) the boundaries of a fluid/coolant flow exiting the nozzle channel.
Figure 4:
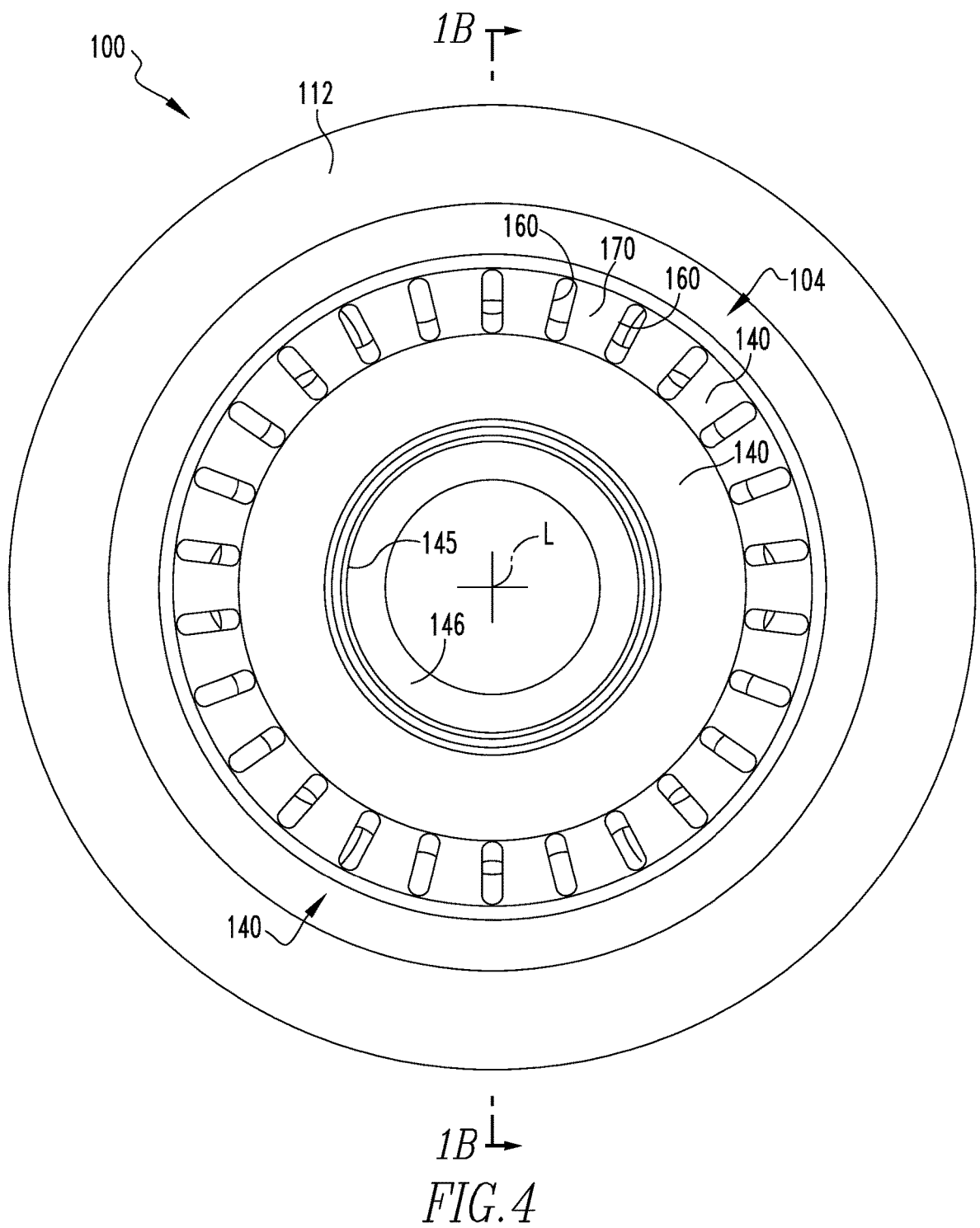
FIG. 4 is a distal end view of the tool holder of FIG. 1A taken along the longitudinal central axis (of the tool holder) showing a tool receiving recess (end/bore) and a tool seat of the adapter, an (inwardly) angled annular surface (of the fluid/coolant directing structure) and a ring of nozzles provided at and circumferentially equidistantly spaced along the angled annular surface.

Referring also to FIGS. 3A, 3B and 4, the fluid/coolant directing structure 140 includes a fluid/coolant chamber 150 fluidically connected and distally positioned in relation to the feeder channels 120, (one or more, or a plurality of) nozzles 160 fluidically connected to the fluid/coolant chamber 150, and an angled annular surface 170 at a distal end 104 of the tool holder 100, the nozzles 160 each facing and being configured/shaped to focus and direct fluid/coolant flow (e.g., in the shape of a thin sheet) that is both radially inwardly and longitudinally distally directed in relation to a longitudinal central axis (denoted "L") of the shank 110. By way of example, FIG. 3B is a pictorial representation of an example configuration/shape of a nozzle channel of the fluid/coolant directing structure 140. In this example embodiment, the nozzles 160 each include (/are defined by) a nozzle inlet 162 fluidically connected to the fluid/coolant chamber 150, a nozzle outlet 164 at the angled annular surface 170, and a nozzle channel 166 spanning between the nozzle inlet 162 and the nozzle outlet 164 (of that nozzle). In this example embodiment, the nozzles 160 each include an inner wall 167 and an outer wall 169 configured/shaped (e.g., as shown) to direct fluid/coolant flow that is both radially inwardly and longitudinally distally directed in relation to the longitudinal central axis (denoted "L") of the shank 110. In this example embodiment, the nozzles 160 each include side walls 168 configured/shaped (e.g., symmetrically and angled as shown; see FIGS. 3A and 3B) to narrow or focus fluid/coolant flow across the nozzle by reducing/restricting the width of the nozzle (i.e., the distance between the side walls 168).

FIG. 3B provides an example of how a nozzle 160 can be configured/shaped to focus and direct fluid/coolant flow (e.g., in the shape of a sheet) that is both radially inwardly and longitudinally distally directed in relation to the longitudinal central axis (denoted "L") of the shank 110 and also includes a pictorial representation of a sheet of fluid/coolant flow 180 (shown in dashed lines) exiting from an individual nozzle, the aforementioned sheet of fluid/coolant flow 180 including sides 182 and 184 and edges 186 and 188. In example embodiments, for each nozzle 160, the length radially along the nozzle (from the inner wall 167 to the outer wall 169) generally increases and the width transversely across the nozzle (between the side walls 168) generally decreases advancing through the nozzle channel 166 from the nozzle inlet 162 to the nozzle outlet 164. In example embodiments, for each nozzle 160, the nozzle 160 is wider across the nozzle inlet 162 than across the nozzle outlet 164. In example embodiments, for each nozzle 160, the nozzle 160 is shorter along the nozzle inlet 162 than along the nozzle outlet 164. In example embodiments, for each nozzle 160, the nozzle 160 is narrower across the nozzle outlet 164 than across the nozzle inlet 162. In example embodiments, for each nozzle 160, the nozzle 160 is longer along the nozzle outlet 164 than along the nozzle inlet 162. In alternative example embodiments, a portion, subset or group of the nozzles (rather than all of the nozzles) is configured in consideration of or consistent with a particular nozzle or fluid/coolant directing structure described herein.

In respect to area restriction ratios (of cross-sectional areas/across flow path), nozzle inlet area/nozzle outlet area (i.e., nozzle ratio) can be 1-5 or higher. In example embodiments (e.g., such as described herein with reference to FIGS. 1A-11), the nozzles are configured/shaped such that the nozzle ratio is around 1.3-1.5. In example embodiments (e.g., such as described herein with reference to FIGS. 12A-18), the nozzles are configured/shaped such that the nozzle ratio is around 3.3-3.4. Further in respect to area restriction ratios, in example embodiments (e.g., such as but not limited to those described herein) feeder channel area/nozzle outlet area (i.e., feeder/nozzle ratio) can be 1-5 or higher.

In example embodiments, for each nozzle 160, a ratio of the area across the nozzle at the nozzle inlet 162 over the area across the nozzle at the nozzle outlet 164 is at least 1.0 (e.g., 1-5 or higher, or around 1.3-1.5). In example embodiments, the feeder channels 120 and the fluid/coolant directing structure 140 are configured such that a ratio of the total area across the feeder channels 120 over the total area across the nozzle(s) at the nozzle outlet(s) 164 is at least 1.0 (e.g., 1-5 or higher, or around 1.4-2.8).

With reference to FIG. 3B, in example embodiments, for each of the nozzles 160, the nozzle inlet 162 and the nozzle outlet 164 define planes 163 and 165, respectively, the planes being approximately (or generally) parallel.

With reference to FIGS. 2A and 3A, in example embodiments, for each of the nozzles 160, a shortest angle (denoted "A") between a vertex (or plane) (denoted "VA") at/defined by the nozzle outlet 164 (e.g., a vertex/plane defined by locations along the nozzle outlet 164) and the longitudinal central axis (denoted "L") is greater than 0° and less than 90° (e.g., around 60°). In example embodiments, for each of the nozzles 160, a shortest angle (denoted "B") between a plane (or vertex) (denoted "VB") at/defined by the nozzle inlet 162 (e.g., a vertex/plane defined by locations along the nozzle inlet 162) and the longitudinal central axis (denoted "L") is greater than 0° and less than 90° (e.g., around 60°).

Figure 3C:
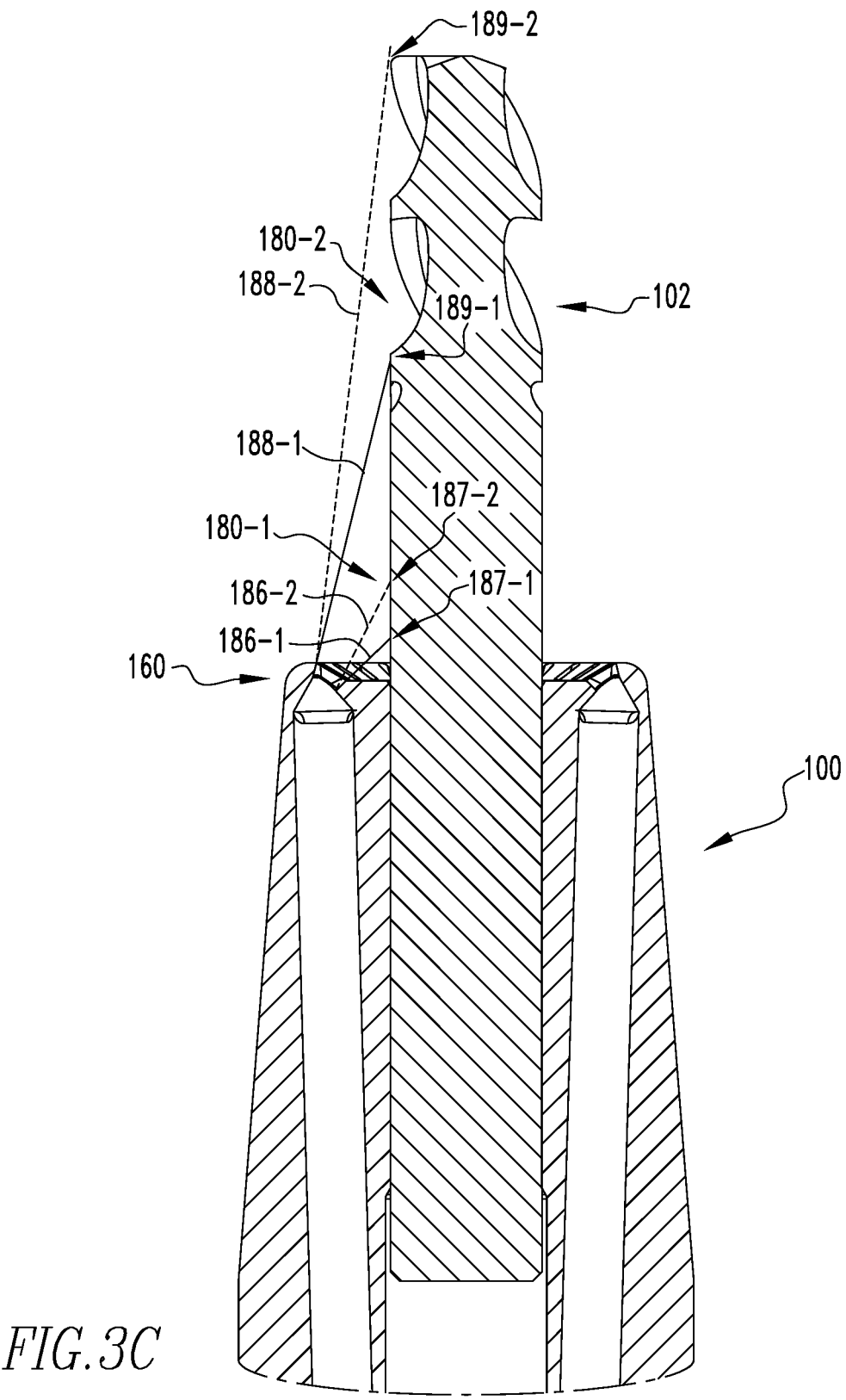
FIG. 3C is a partial view of the cross-sectional elevation view of FIG. 1B providing a pictorial representation of how (in use when the tool holder is rotating) the spray path widens as the fluid/coolant moves distally farther from the nozzle.

With reference also to FIG. 3C, this figure provides a pictorial representation of how in use when the tool holder 100 is rotating (e.g., at 10,000 rpm with nozzle pressure 1500 psi) the spray path widens as the fluid/coolant moves distally farther from the nozzle 160. At rotation speed 0 rpm, the spray angle of sheet 180-1 is defined by the inner wall 167 and the outer wall 169 (of the nozzle 160) and at its longitudinal opposite ends is represented by solid lines 186-1 and 188-1 which, as shown in this example, are incident upon the cutting tool 102 at an inner contact point 187-1 and an outer contact point 189-1, respectively. When in use (e.g., rotating and with fluid pressurized at the nozzle as previously discussed), the spray angle of sheet 180-2 is changed due to centrifugal force increasing the amount of axial coverage and at its longitudinal opposite ends the spray angle is now represented by dashed lines 186-2 and 188-2 which, as shown in this example, are incident upon the cutting tool 102 at an inner contact point 187-2 and an outer contact point 189-2, respectively. Thusly, in example embodiments, the positions and angular orientations of the inner and outer walls 167, 169 (of the nozzles 160) relative to the cutting tool 102 (when fully received/seated and secured within the holder) can be determined in consideration of: relative positions/orientations of the inner and outer walls 167, 169 with respect to portions of the cutting tool 102 extending from the holder; a specified rotation speed or a range of rotation speeds (e.g., associated with the cutting tool 102 and/or the holder); and a specified nozzle pressure or a range of nozzle pressures (e.g., associated with the holder).

Figure 5:
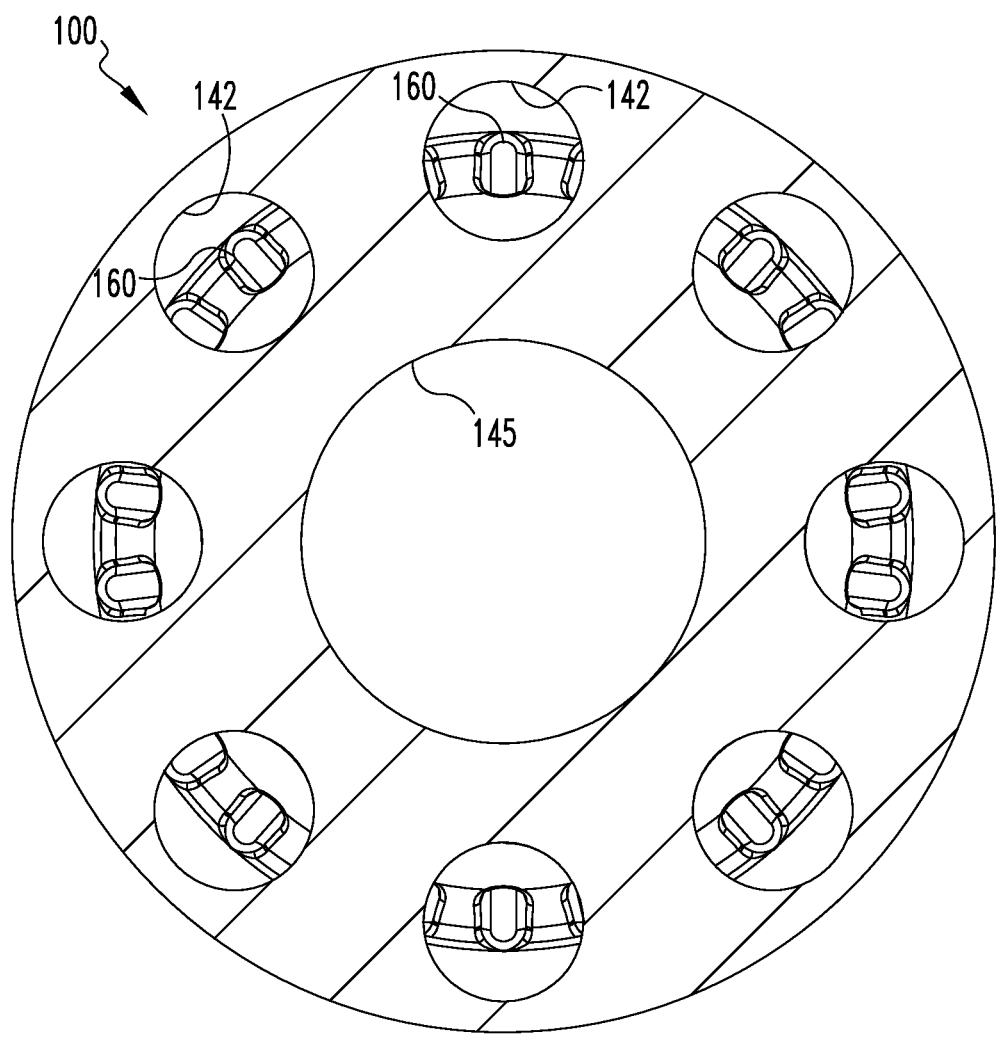
FIG. 5 is a cross-sectional view of the example embodiment of a tool holder (taken through line 5-5 of FIG. 1B) showing eight openings into the fluid/coolant directing structure overlaying and coaligned with the feeder channels.
Figure 6:
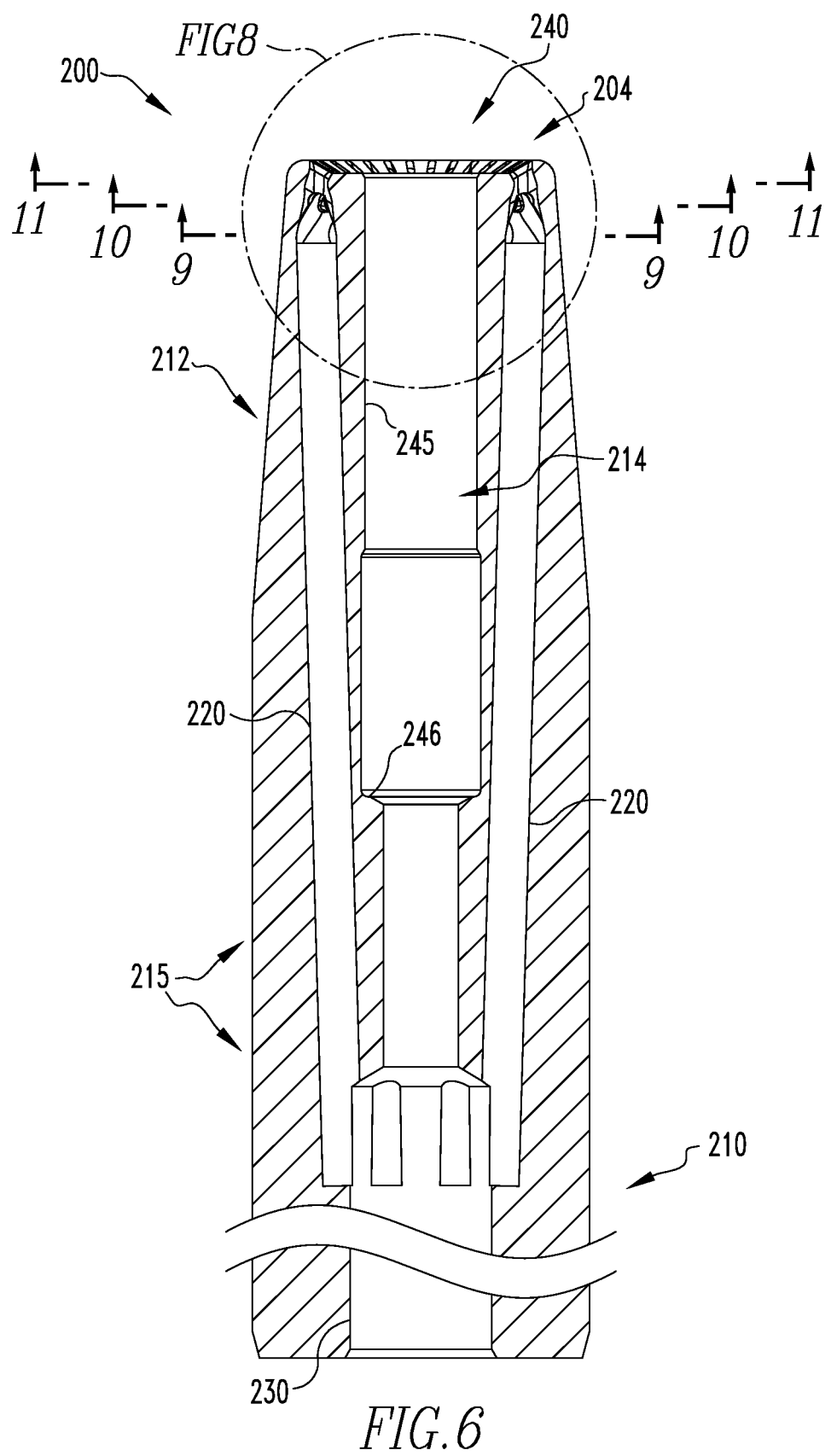
FIG. 6 is a cross-sectional elevation view (taken through line 6-6 of FIG. 7B) of an example embodiment of a tool holder with fluid directing passages including a fluid/coolant directing structure inclusive of manifolds configured for directly feeding inlets of nozzles.

In example embodiments, the nozzles 160 are circumferentially evenly spaced along/around the angled annular surface 170 (or provided otherwise, e.g., at a periphery portion 116 of the tool holder 100). With reference also to FIG. 5, in this example embodiment, the openings 142 into the fluid/coolant directing structure 140 overlaying and coaligned with the feeder channels 120 comprise (or consist) of eight openings. The feeder channels 120 are (located generally circumferentially in relation to and) substantially evenly spaced (or evenly distributed in respect to flow volume facilitated) about the longitudinal central axis (denoted "L") of the shank 110. The number and arrangement of the feeder channels 120 can differ from the example embodiments described/provided herein.

With reference to FIGS. 6-11, in this example embodiment involving a fluid/coolant directing structure incorporating an arrangement of manifolds directly feeding inlets of nozzles, the tool holder 200 includes a shank 210 including a distal portion 212 and a fluid/coolant directing structure 240 provided (e.g., built utilizing a 3D printing process) at a distal/distally-facing portion of the shank. Thusly, and as further discussed below, the fluid/coolant directing structure 240 is (connected/)coupled to the distal portion 212. The distal portion 212 of the shank includes feeder channels 220 (e.g., six feeder channels equally spaced thereabout).

Figure 8:
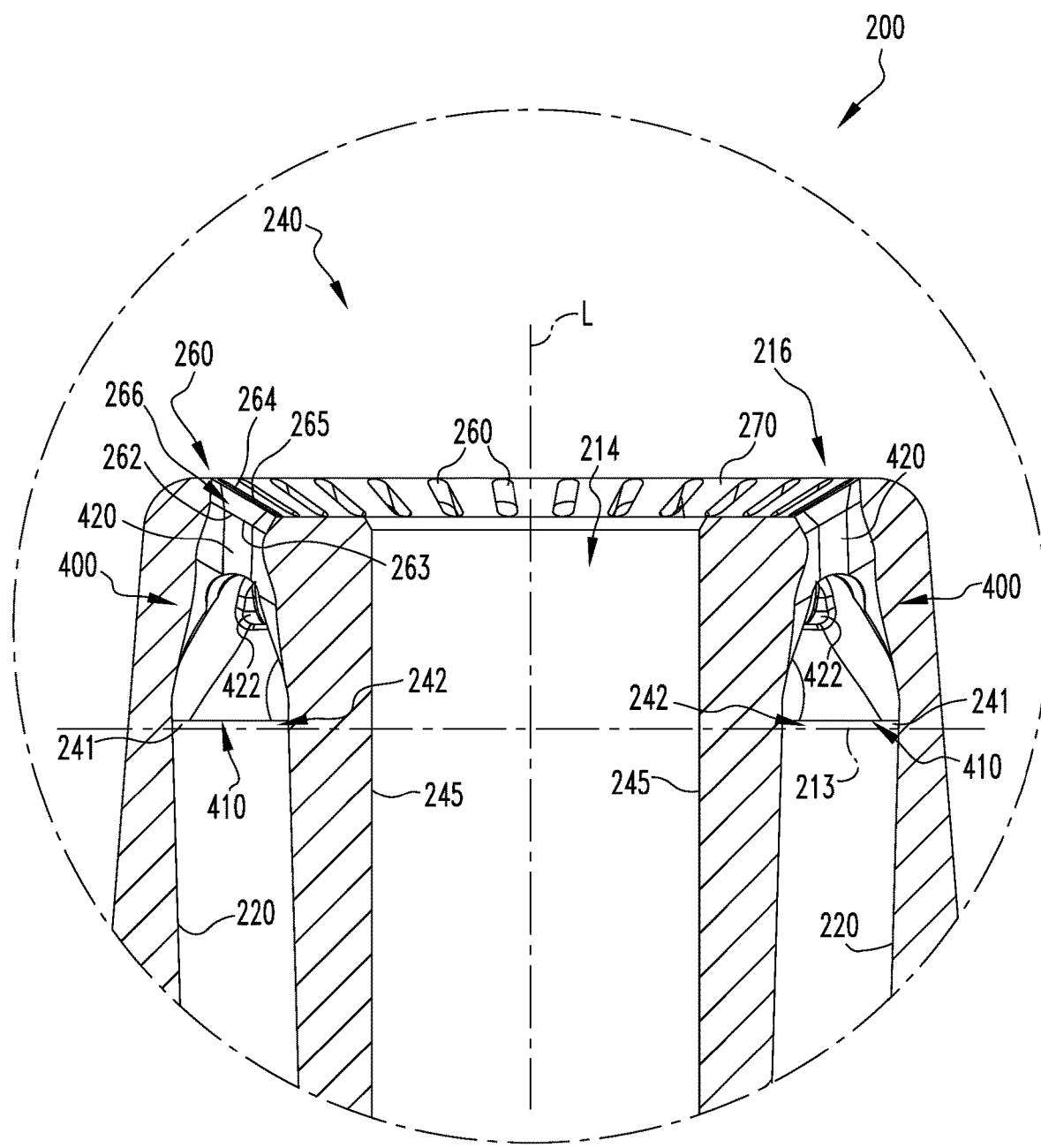
FIG. 8 is an enlarged cross-sectional view of the tool holder (at the circular region denoted by line 8 of FIG. 6) showing portions of the manifolds and the fluid/coolant directing structure inclusive of the nozzles at the angled annular surface of the structure.

Referring to FIG. 8, in example embodiments, the tool holder 200 further includes a structure 241 at a distally-facing surface 213 of the shank 210. The structure 241 has openings 242 fluidically connected (e.g., overlaying and coaligned as shown) with the feeder channels 220, and the fluid/coolant directing structure 240 is formed/built upon the structure 241 (e.g., utilizing a 3D printing process). The manifolds 400 are evenly distributed about a periphery portion 216 of the tool holder 200. The fluid/coolant directing structure 240 includes a plurality of manifolds 400 fluidically connected to and distally positioned in relation to the feeder channels 220, (one or more, or a plurality of) nozzles 260 fluidically connected to the manifolds 400 and an angled annular surface 270 at a distal end 204 of the tool holder 200. In example embodiments, the manifolds 400 each have a manifold inlet channel 410 and a plurality of manifold outlet channels 420 configured to substantially evenly distribute/divide fluid/coolant flow from the manifold inlet channel 410 as between the manifold outlet channels 420 (of that manifold). As with the (previously described) fluid/coolant directing structure 140 and its nozzles 160, the nozzles 260 each face and are configured/shaped to focus and direct fluid/coolant flow (e.g., in the shape of a sheet) that is both radially inwardly and longitudinally distally directed in relation to a longitudinal central axis (denoted "L") of the shank 210.

Figure 7A:
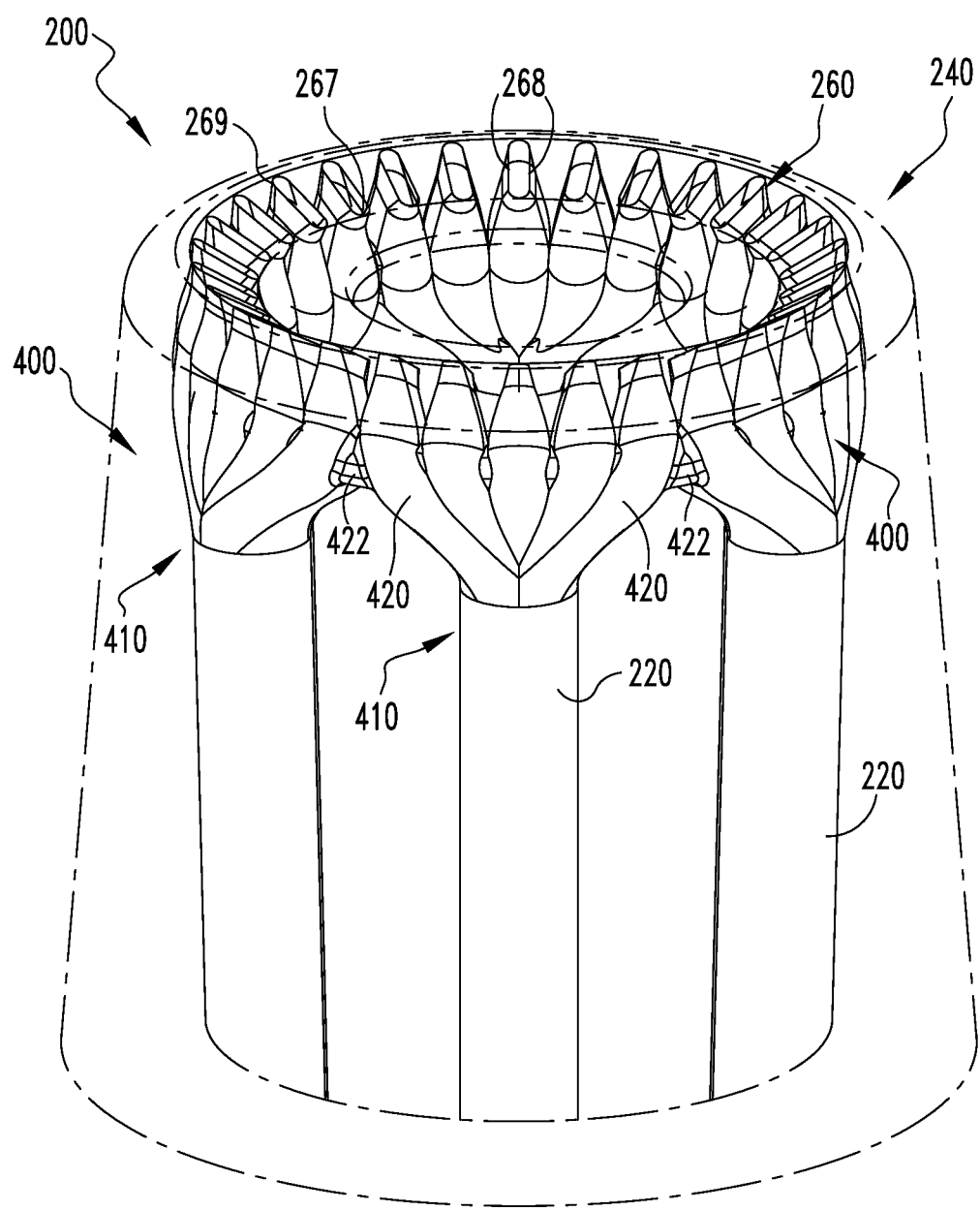
FIG. 7A is a perspective view of the tool holder of FIG. 6 showing, in this example embodiment, that the manifolds including six manifolds each having a manifold inlet channel and five manifold outlet channels, the manifold outlet channels being sequentially positioned about a periphery portion of the adapter and configured for directly feeding nozzles (at the angled annular surface) of the fluid/coolant directing structure—an exterior portion of the tool holder being depicted as invisible in this view such that portions of the fluid/coolant directing structure (inclusive of the manifolds and the nozzles at the angled annular surface of the structure) and the feeder channels can be seen.
Figure 7B:
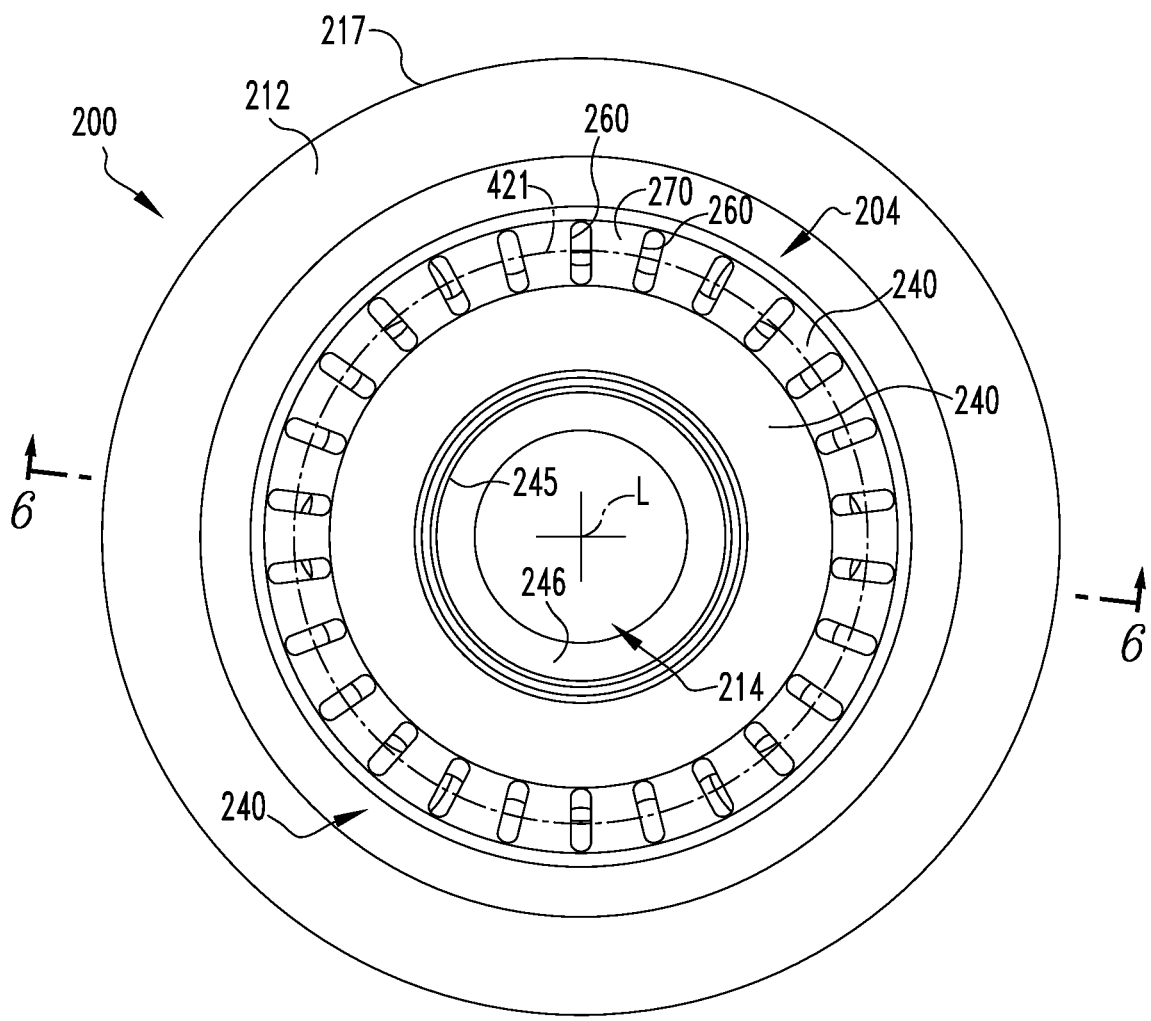
FIG. 7B is a distal end view of the tool holder of FIG. 6 taken along the longitudinal central axis (of the tool holder) showing a tool receiving recess (end/bore) and a tool seat of the adapter, an (inwardly) angled annular surface (of the fluid/coolant directing structure) and a ring of nozzles provided at and circumferentially arranged along a path concentrically within an outer periphery (at the distal end) of the adapter.

Referring also to FIG. 7B, in this example embodiment, the angled annular surface 270 is positioned (e.g., circumferentially/concentrically positioned) about the tool receiving recess 214. The distal portion 212 includes an outer periphery 217 and, for each of the manifolds 400, the manifold outlet channels 420 are sequentially arranged along a path 421 (e.g., a circular or arcuate path) concentrically within the outer periphery 217. Referring also to FIG. 7A, in this example embodiment, for each of the manifolds 400, the plurality of manifold outlet channels 420 comprises (or consists of) five manifold outlet channels. The number and arrangement of the manifold outlet channels 420 can differ from the example embodiments described/provided herein.

Figure 10:
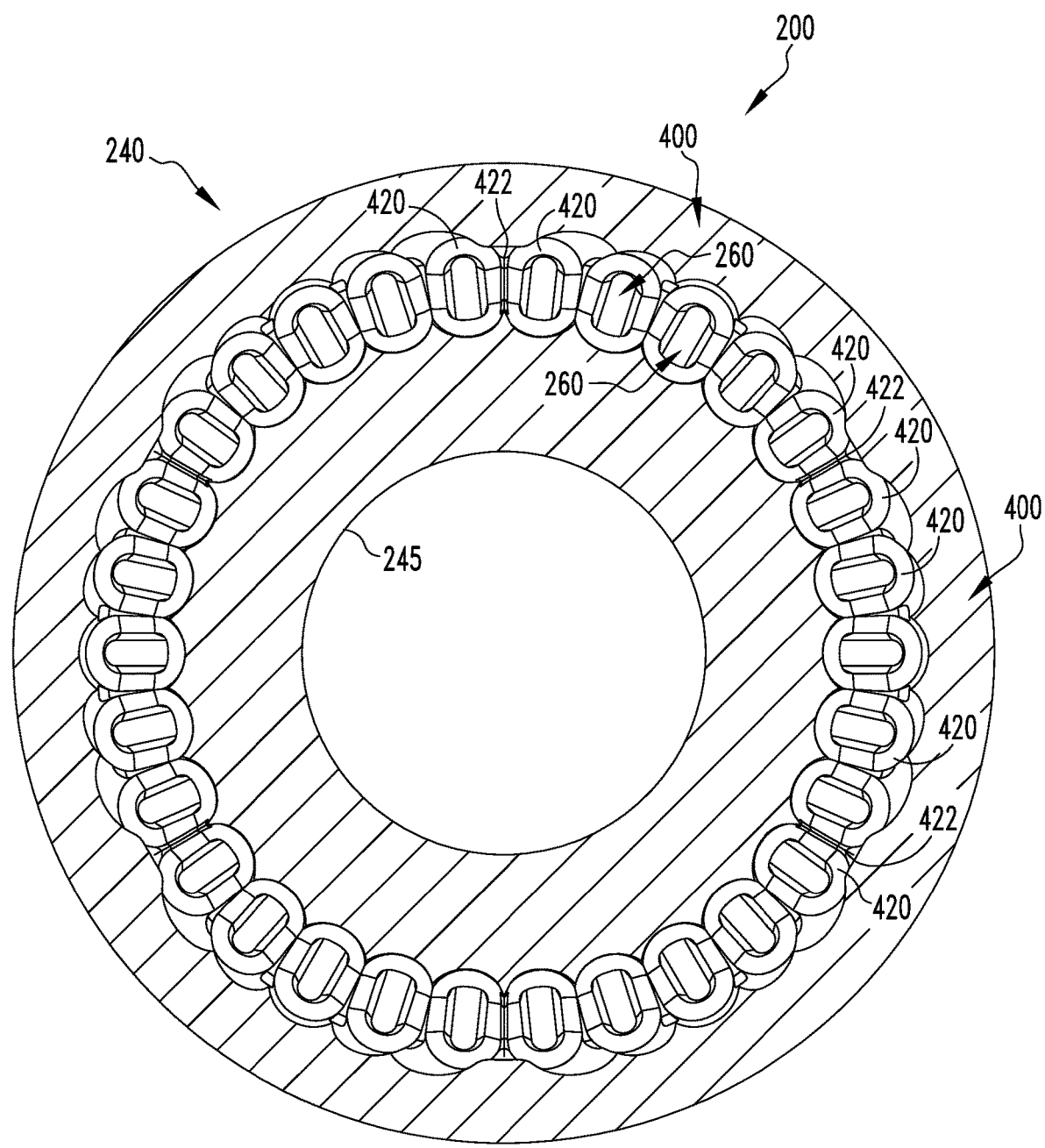
FIG. 10 is a cross-sectional view of the example embodiment of a tool holder (taken through line 10-10 of FIG. 6) showing the manifold outlet channels fluidically interconnected end-to-end at interconnection portions of the manifold outlet channels.

In example embodiments, the manifolds 400, at the manifold outlet channels 420, are interconnected together (e.g., integrally formed) along the path 421 (FIG. 7B). Referring also to FIG. 10, in this example embodiment, the manifolds 400 are fluidically interconnected end-to-end at interconnection portions 422 of the manifold outlet channels 420, the interconnection portions 422 defining channels that fluidically interconnect adjacent manifold outlet channels 420 (e.g., as shown).

The angled annular surface 270 inclusive of/defining nozzles 260 is further discussed below and incorporates herein previous descriptions/discussion of the substantially corresponding angled annular surface 170 and nozzles 160 of the tool holder 100.

In example embodiments, the fluid/coolant directing structure 240 is generally disk-shaped or ring-shaped and the angled annular surface 270 thereof is formed with nozzles 260 (e.g., equidistantly distributed along/around the angled annular surface 270 as shown). In example embodiments, the plurality of manifolds 400 and the nozzles 260 are integrally formed or otherwise formed or connected together providing the fluid/coolant directing structure 240. In example embodiments, the fluid/coolant directing structure 240 and/or at least a portion of the tool holder 200 includes material from or in the form of one or more 3D printed objects. In example embodiments, the entirety of the tool holder 200, or a portion thereof, is manufactured utilizing a 3D printing, machining, casting or other process.

The shank 210 includes one or more fluid/coolant inlets 230 along the shank, the fluid/coolant inlets 230 including feeder channels 220 at the distal portion 212, the distal portion 212 including a tool receiving recess (end/bore) 214 configured/sized to receive a cutting tool 102 therein and including a tool coupling interface portion 245 and a tool seat 246 of the adapter. The tool coupling interface portion 245 is, for example, a cylindrical bore precisely machined to be provided with an ambient temperature inner diameter sized sufficiently smaller than an ambient temperature outer diameter of the cutting tool in order for the interface portion 245 to serve as a shrink fit adapter which, upon being heated, expands a sufficient amount to receive the cutting tool therein and thereafter, after its temperature is lowered, radially inwardly contracts essentially fusing the tool and interface portion together thereby providing the shrink fit— the aforementioned basic operational features/functionalities of shrink fit adapters being understood by those of skill in the art.

Figure 11:
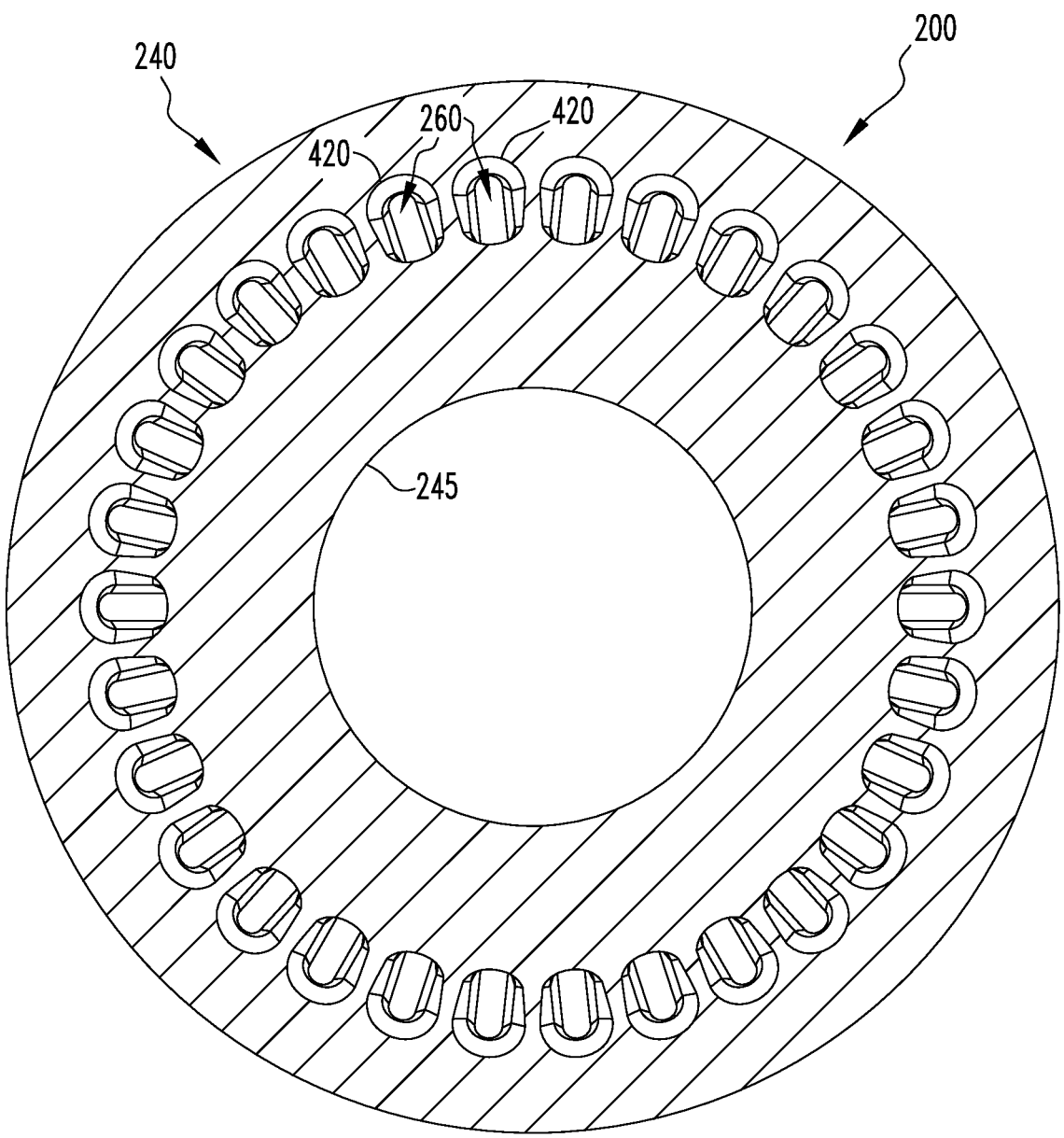
FIG. 11 is a cross-sectional view of the example embodiment of a tool holder (taken through line 11-11 of FIG. 6) showing the manifold outlet channels individually directly feeding/transitioning into each of the nozzles, respectively.

Referring to FIGS. 8 and 11, in this example embodiment, the nozzles 260 each include (/are defined by) a nozzle inlet 262 (individually) fluidically connected to the manifold outlet channels 420, respectively, a nozzle outlet 264 at the angled annular surface 270, and a nozzle channel 266 spanning between the nozzle inlet 262 and the nozzle outlet 264 (of that nozzle). In this example embodiment, the nozzles 260 each include an inner wall and an outer wall configured/shaped (e.g., as shown/described in relation to the inner wall 167 and the outer wall 169 of the tool holder 100) to direct fluid/coolant flow that is both radially inwardly and longitudinally distally directed in relation to the longitudinal central axis (denoted "L") of the shank 210. In this example embodiment, the nozzles 260 each include side walls configured/shaped (e.g., symmetrically and angled as shown/described in relation to the side walls 168 of the tool holder 100) to narrow or focus fluid/coolant flow across the nozzle by reducing/restricting the width of the nozzle (i.e., the distance between the side walls).

The previously described example with reference to FIG. 3B of how the nozzle 160 can be configured/shaped to focus and direct fluid/coolant flow (e.g., in the shape of a sheet) that is both radially inwardly and longitudinally distally directed in relation to the longitudinal central axis (denoted "L") of the shank 110 is also applicable to the nozzles 260 and hereby incorporated by reference. Accordingly in example embodiments, for each nozzle 260, the length radially along the nozzle (from the inner wall to the outer wall of the nozzle) generally increases and the width transversely across the nozzle (between the side walls 268 of the nozzle) generally decreases advancing through the nozzle channel 266 from the nozzle inlet 262 to the nozzle outlet 264. In example embodiments, for each nozzle 260, the nozzle 260 is wider across the nozzle inlet 262 than across the nozzle outlet 264. In example embodiments, for each nozzle 260, the nozzle 260 is shorter along the nozzle inlet 262 than along the nozzle outlet 264. In example embodiments, for each nozzle 260, the nozzle 260 is narrower across the nozzle outlet 264 than across the nozzle inlet 262. In example embodiments, for each nozzle 260, the nozzle 260 is longer along the nozzle outlet 264 than along the nozzle inlet 262. In alternative example embodiments, a portion, subset or group of the nozzles (rather than all of the nozzles) is configured in consideration of or consistent with a particular nozzle or fluid/coolant directing structure described herein.

Referring to FIG. 7A, in this example embodiment, the nozzles 260 each include an inner wall 267 and an outer wall 269 configured/shaped (e.g., as shown) to direct fluid/coolant flow that is both radially inwardly and longitudinally distally directed in relation to the longitudinal central axis (denoted "L") of the shank 210. In this example embodiment, the nozzles 260 each include side walls 268 configured/shaped (e.g., symmetrically and angled as shown) to narrow or focus fluid/coolant flow across the nozzle by reducing/restricting the width of the nozzle (i.e., the distance between the side walls 268).

In respect to area restriction ratios (of cross-sectional areas/across flow path), nozzle inlet area/nozzle outlet area (i.e., nozzle ratio) can be 1-5 or higher. In example embodiments (e.g., such as described herein with reference to FIGS. 1A-11), the nozzles are configured/shaped such that the nozzle ratio is around 1.3-1.5. In example embodiments (e.g., such as described herein with reference to FIGS. 12A-18), the nozzles are configured/shaped such that the nozzle ratio is around 3.3-3.4. Further in respect to area restriction ratios, in example embodiments (e.g., such as but not limited to those described herein) total feeder channel area/total nozzle outlet area (i.e., feeder/nozzle ratio) can be 1-5 or higher.

In example embodiments, for each nozzle 260, a ratio of the area across the nozzle at the nozzle inlet 262 over the area across the nozzle at the nozzle outlet 264 is at least 1.0 (e.g., 1-5 or higher, or around 1.3-1.5). In example embodiments, the feeder channels 220 and the fluid/coolant directing structure 240 are configured such that a ratio of the total area across the feeder channels 220 over the total area across the nozzle(s) 260 at the nozzle outlet(s) 264 is at least 1.0 (e.g., 1-5 or higher, or around 1.4-2.8).

With reference to FIG. 8, in example embodiments, for each of the nozzles 260, the nozzle inlet 262 and the nozzle outlet 264 define paths (of planes) 263 and 265, respectively, the paths/planes being approximately (or generally) parallel.

The previous discussion of the nozzles 160 with reference to FIG. 3A is also applicable to the nozzles 260 and hereby incorporated by reference. Accordingly in example embodiments, for each of the nozzles 260, a shortest angle (denoted "A") between a vertex (or plane) (denoted "VA") at/defined by the nozzle outlet 264 (e.g., a vertex/plane defined by locations along the nozzle outlet 264) and the longitudinal central axis (denoted "L") is greater than 0° and less than 90° (e.g., around 60°). In example embodiments, for each of the nozzles 260, a shortest angle (denoted "B") between a plane (or vertex) (denoted "VB") at/defined by the nozzle inlet 262 (e.g., a vertex/plane defined by locations along the nozzle inlet 262) and the longitudinal central axis (denoted "L") is greater than 0° and less than 90° (e.g., around 60°).

Figure 9:
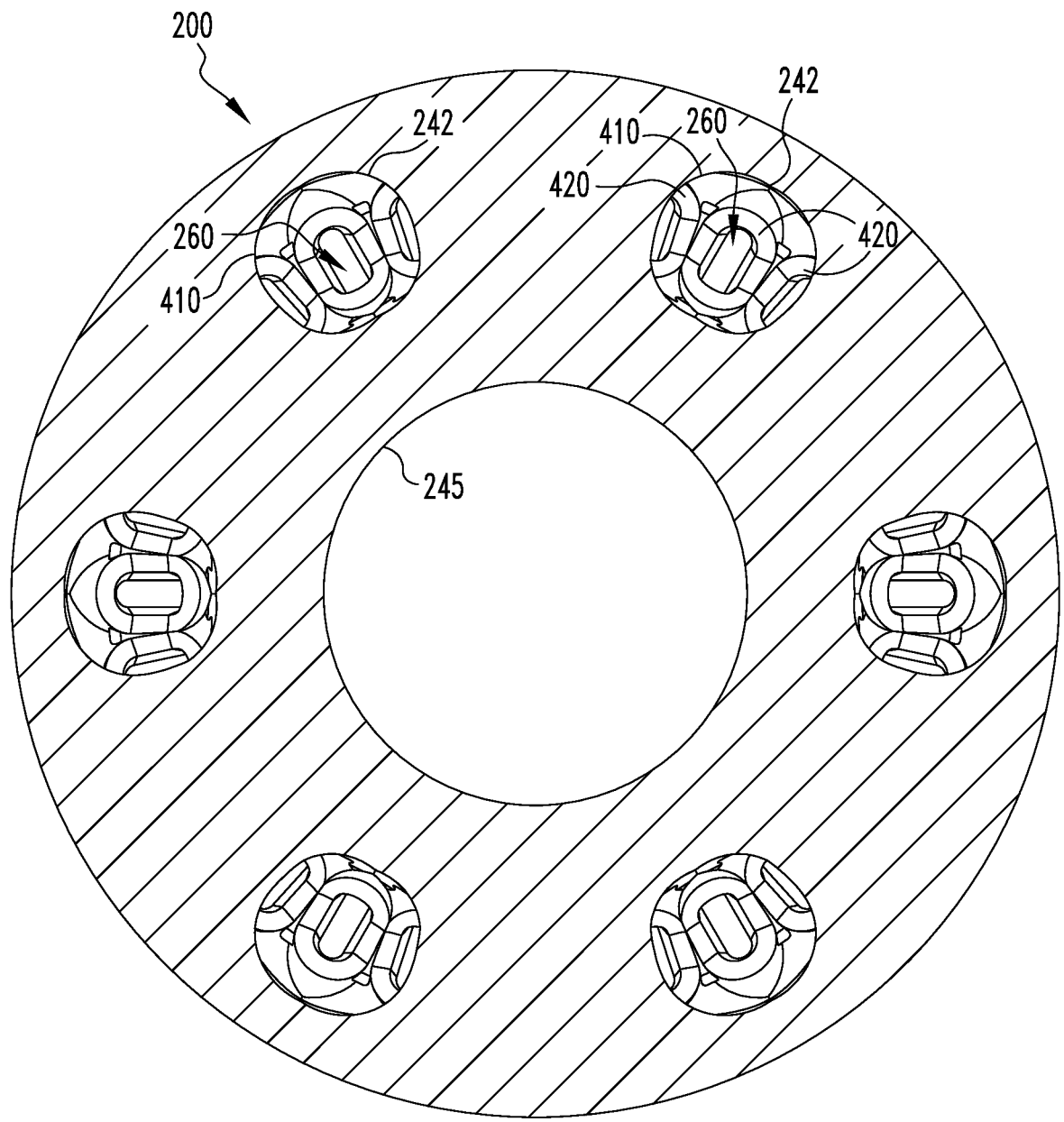
FIG. 9 is a cross-sectional view of the example embodiment of a tool holder (taken through line 9-9 of FIG. 6) showing six openings into the fluid/coolant directing structure overlaying and coaligned with the feeder channels and, through each opening (of the manifolds, respectively), the manifold inlet channel transitioning into the manifold outlet channels (of that manifold)

In example embodiments, the nozzles 260 are circumferentially evenly spaced along/around the angled annular surface 270 (or provided otherwise, e.g., at a periphery portion 216 of the tool holder 200). With reference also to FIG. 9, in this example embodiment, the openings 242 into the fluid/coolant directing structure 240 overlaying and coaligned with the feeder channels 220 comprise (or consist) of six openings. The feeder channels 220 are (located generally circumferentially in relation to and) substantially evenly spaced (or evenly distributed in respect to flow volume facilitated) about the longitudinal central axis (denoted "L") of the shank 210. The number and arrangement of the feeder channels 220 can differ from the example embodiments described/provided herein.

Thus, in an example embodiment of a tool holder with fluid directing passages, the tool holder includes: a shank including a distal portion and one or more coolant inlets along the shank, the coolant inlets including feeder channels at the distal portion, the distal portion including a tool receiving recess configured/sized to receive a cutting tool therein and including a tool coupling interface portion; and a fluid/coolant directing structure coupled to the distal portion, the fluid/coolant directing structure including a plurality of manifolds fluidically connected to and distally positioned in relation to the feeder channels, nozzles fluidically connected to the manifolds and an angled annular surface at a distal end of the tool holder, the manifolds each having a manifold inlet channel and a plurality of manifold outlet channels configured to substantially evenly distribute/divide fluid/coolant flow from the manifold inlet channel as between the manifold outlet channels, the nozzles each facing and being configured/shaped to focus and direct fluid/coolant flow that is both radially inwardly and longitudinally distally directed in relation to a longitudinal central axis of the shank.

In another aspect of the technologies described herein, a fluid/coolant directing structure includes: one or more manifolds, the manifold(s) each having a manifold inlet channel and a plurality of manifold outlet channels configured to substantially evenly distribute/divide fluid/coolant flow from the manifold inlet channel as between the manifold outlet channels. In example embodiments, the fluid/coolant directing structure is part of a tool holder and the one or more manifolds include a plurality of manifolds circumferentially distributed within/about a periphery portion of the tool holder.

With reference to FIGS. 12A-18, in this example embodiment involving a fluid/coolant directing structure incorporating (approximately) sinusoidally varying surfaces of a single nozzle outlet circumferentially disposed about a tool, the tool holder 300 includes a shank 310 including a distal portion 312 and a fluid/coolant directing structure 340 provided (e.g., built utilizing a 3D printing process) at a distal/distally-facing portion of the shank. Thusly, and as further discussed below, the fluid/coolant directing structure 340 is (connected/)coupled to the distal portion 312. The shank 310 includes one or more fluid/coolant inlets 330 along the shank, the fluid/coolant inlets 330 including feeder channels 320 at the distal portion 312. The distal portion 312 of the shank includes the feeder channels 320 (e.g., six feeder channels equally spaced thereabout) and a tool receiving recess (end/bore) 314 configured/sized to receive a cutting tool 102 therein and including a tool coupling interface portion 345 and a tool seat 346 of the adapter. The tool coupling interface portion 345 is, for example, a cylindrical bore precisely machined to be provided with an ambient temperature inner diameter sized sufficiently smaller than an ambient temperature outer diameter of the cutting tool in order for the interface portion 345 to serve as a shrink fit adapter which, upon being heated, expands a sufficient amount to receive the cutting tool therein and thereafter, after its temperature is lowered, radially inwardly contracts essentially fusing the tool and interface portion together thereby providing the shrink fit—the aforementioned basic operational features/functionalities of shrink fit adapters being understood by those of skill in the art.

Figure 12A:
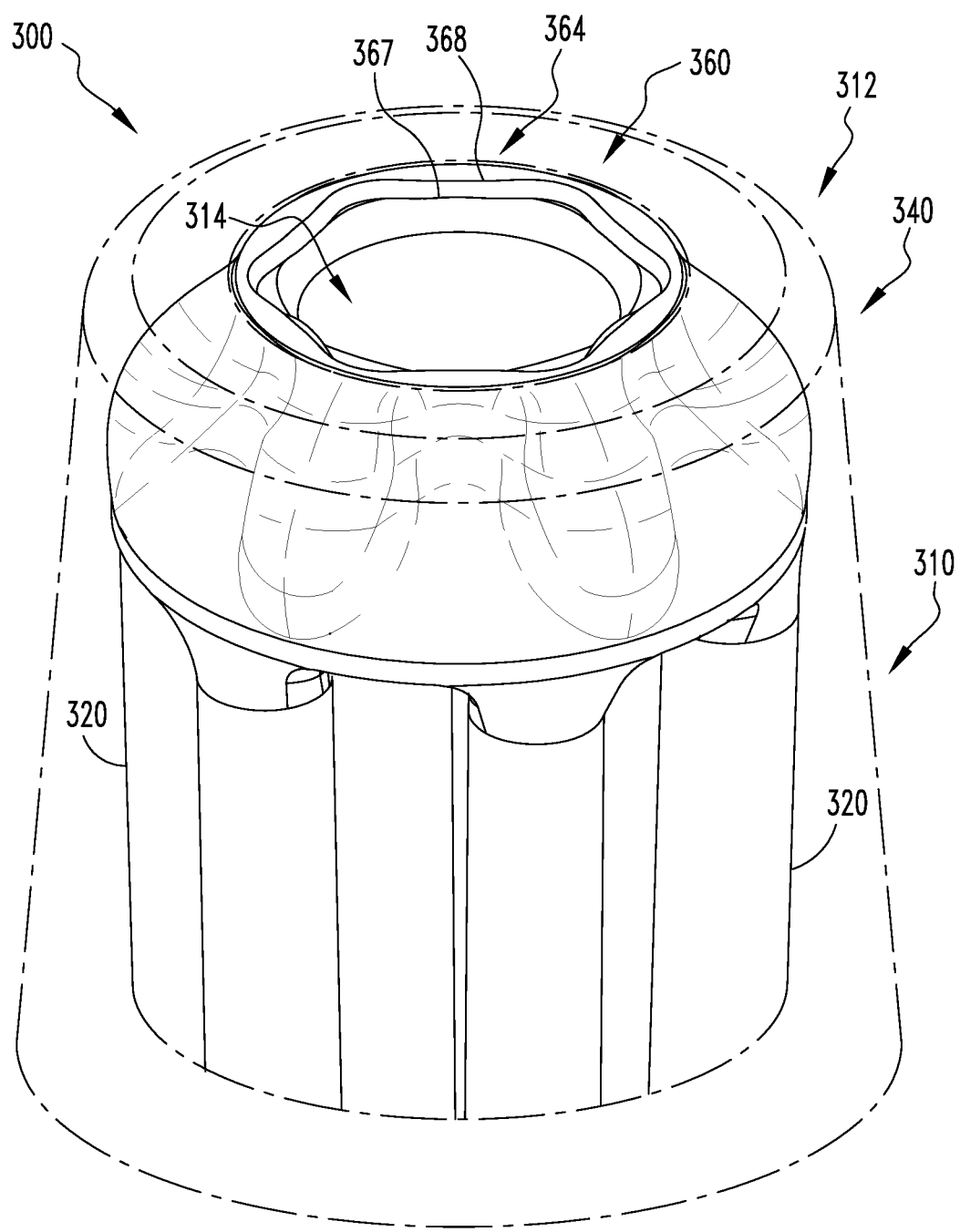
FIG. 12A is a perspective view of an example embodiment of a tool holder with fluid directing passages including a fluid/coolant directing structure incorporating (approximately) sinusoidally varying surfaces of a single nozzle outlet circumferentially disposed about a tool receiving recess (end/bore) of the adapter—an exterior portion of the tool holder being depicted as invisible in this view such that portions of the fluid/coolant directing structure (inclusive of an outer wall of a fluid/coolant chamber between the nozzle outlet and the feeder channels) and the feeder channels can be seen.
Figure 12B:
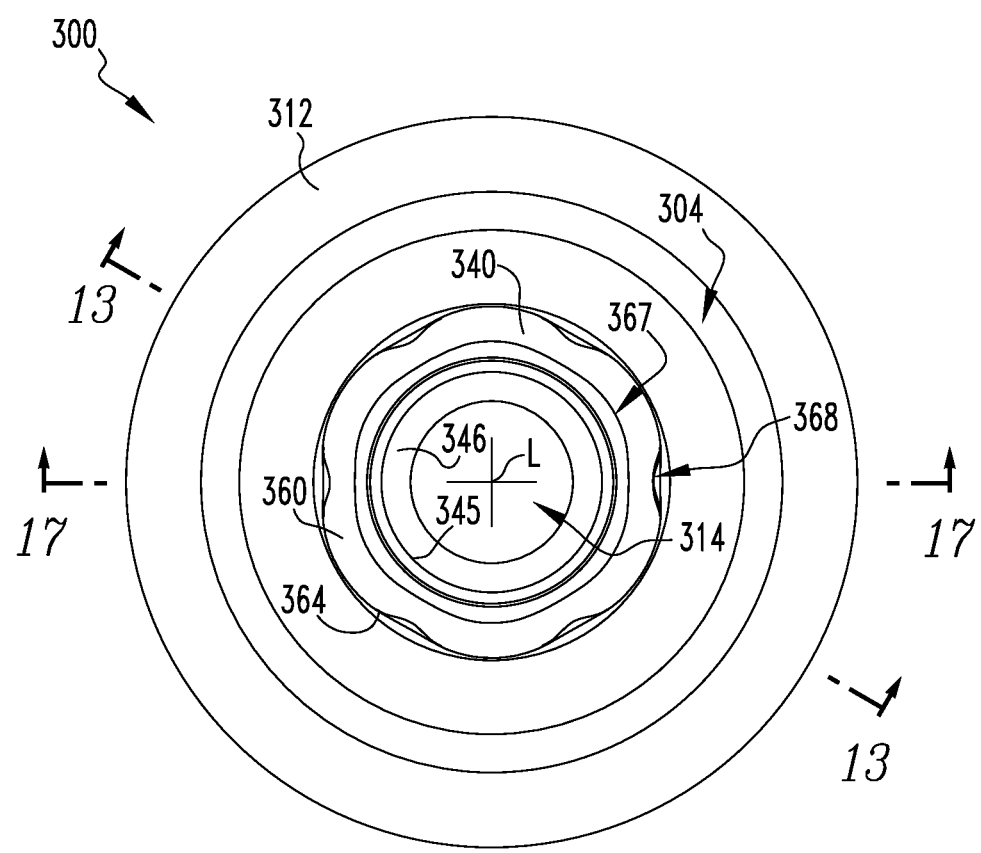
FIG. 12B is a distal end view of the tool holder of FIG. 12A taken along the longitudinal central axis (of the tool holder) showing a tool receiving recess (end/bore) and a tool seat of the adapter and a generally ring-shaped nozzle outlet at a distal end of the adapter, the nozzle outlet having inner and outer edges that vary (approximately) sinusoidally in position relative to the longitudinal central axis moving circumferentially around the nozzle.
Figure 14:
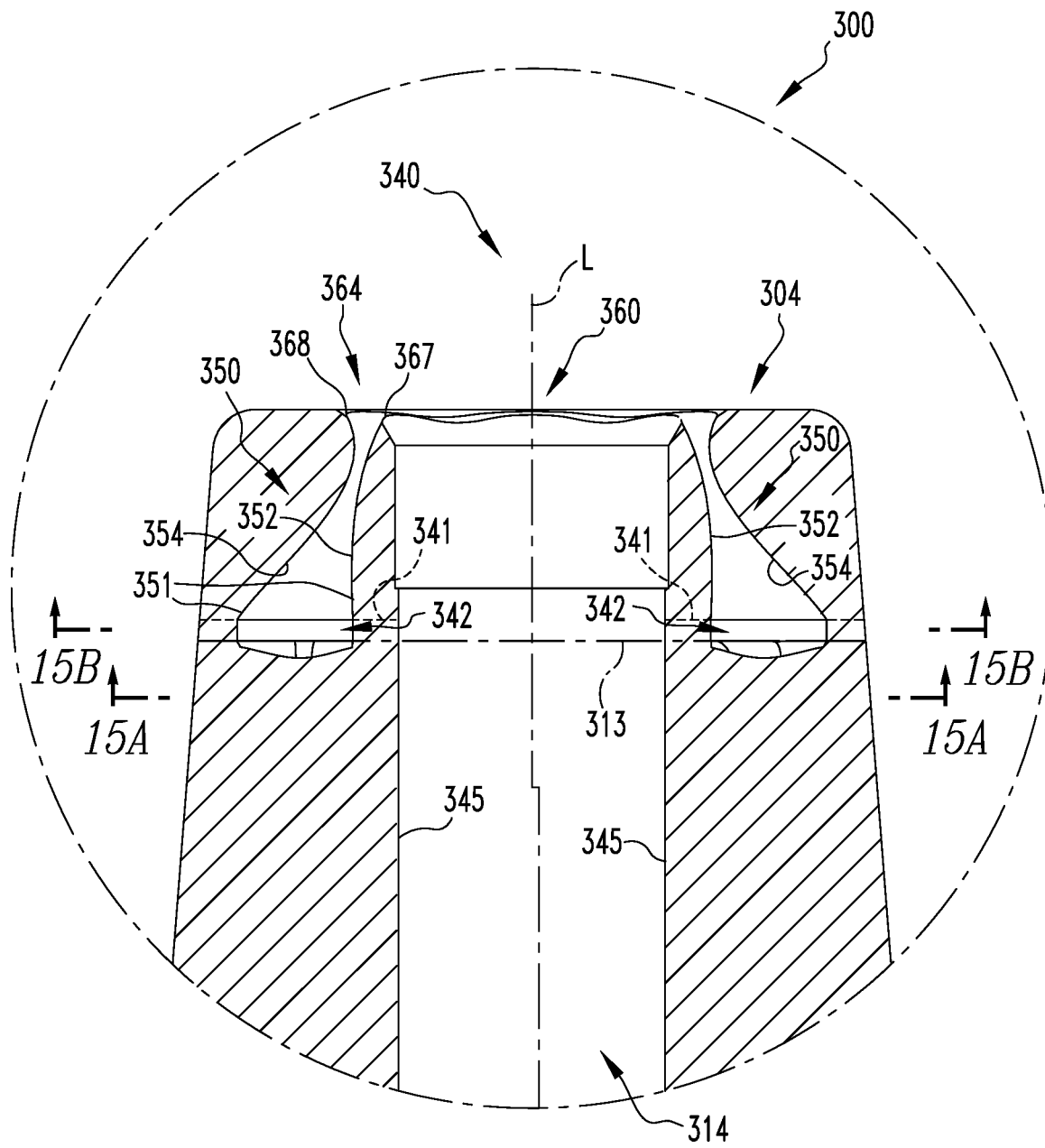
FIG. 14 is an enlarged cross-sectional view of the tool holder (at the circular region denoted by line 14 of FIG. 13) showing portions of the generally ring-shaped nozzle outlet and of the fluid/coolant chamber configured/shaped to direct fluid/coolant flow that is predominantly longitudinally distally directed (in relation to the longitudinal central axis) and openings into the fluid/coolant directing structure overlaying and fluidically connected with the feeder channels.
Figure 15A:
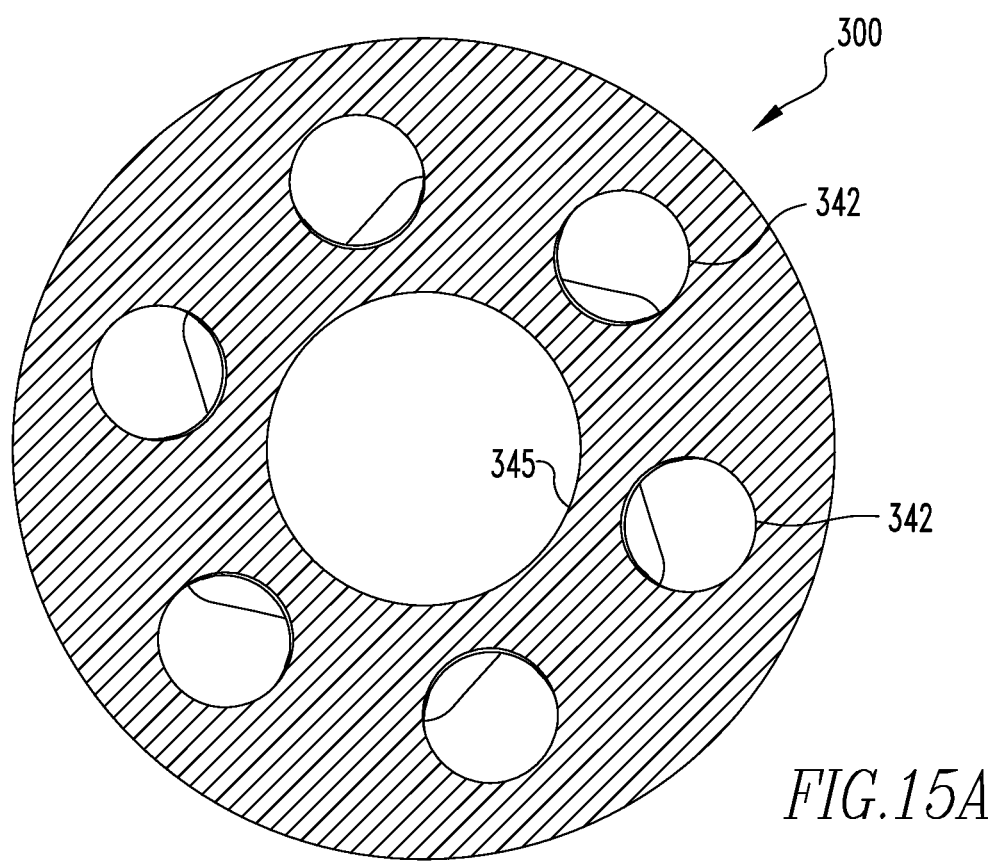
FIG. 15A is a cross-sectional view of the example embodiment of a tool holder (taken through line 15A-15A of FIG. 14) showing six openings into the fluid/coolant directing structure overlaying and coaligned with the feeder channels.
Figure 15B:
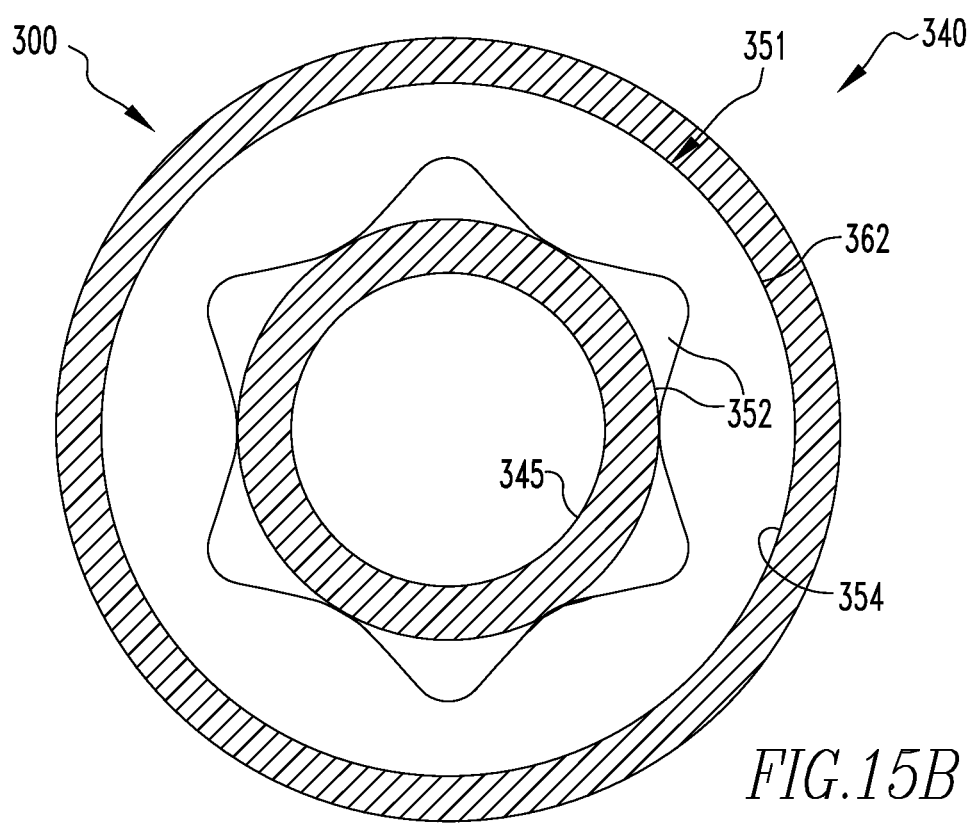
FIG. 15B is a cross-sectional view of the example embodiment of a tool holder (taken through line 15B-15B of FIG. 14) showing a ring-shaped reservoir (at the proximal beginning of the fluid/coolant chamber) coaligned at concentric inner and outer boundaries (of the ring-shaped reservoir) with the feeder channels.
Figure 16A:
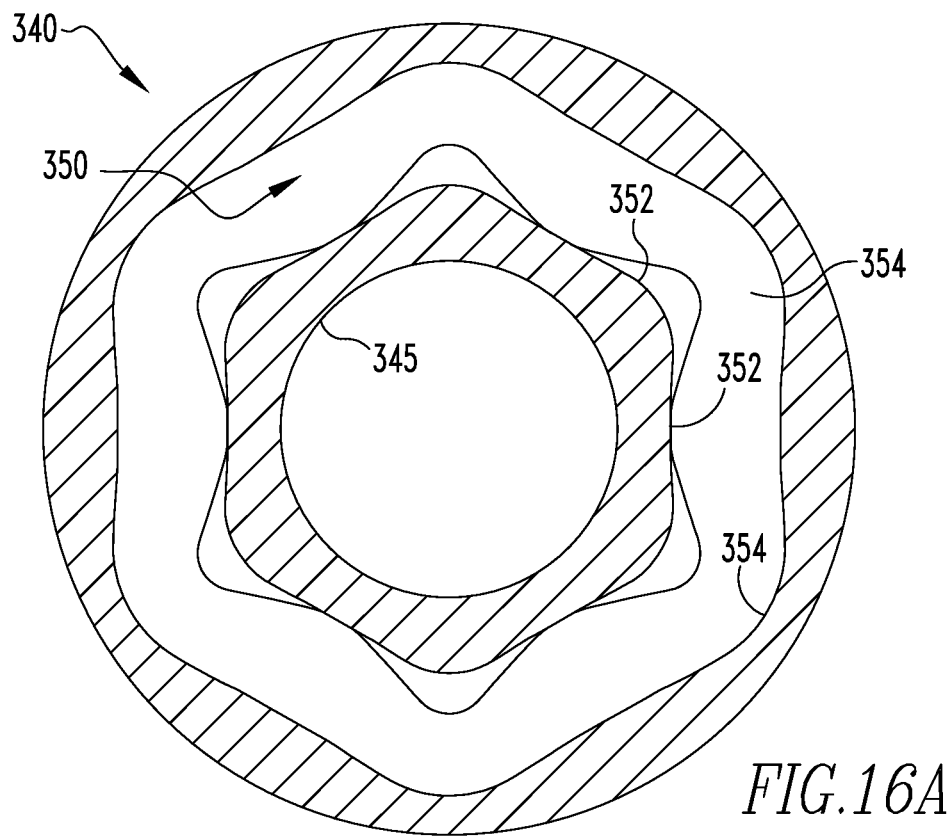
FIG. 16A is a cross-sectional view of the example embodiment of a tool holder (taken through line 16A-16A of FIG. 13) showing the nozzle defined by the inner wall and the outer wall (of the fluid/coolant chamber) narrowing at this position and modulating circumferentially thereabout (as shown)
Figure 16B:
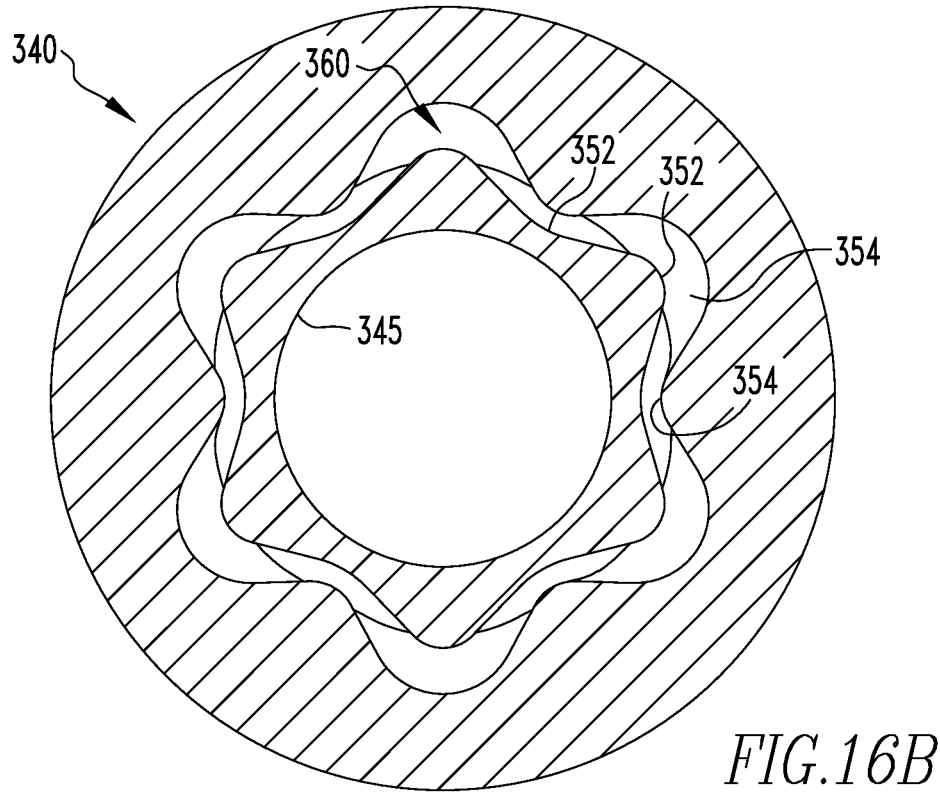
FIG. 16B is a cross-sectional view of the example embodiment of a tool holder (taken through line 16B-16B of FIG. 13) showing the nozzle defined by the inner wall and the outer wall (of the fluid/coolant chamber) further narrowing at this position approaching the nozzle outlet and modulating circumferentially thereabout (as shown)
Figure 18:
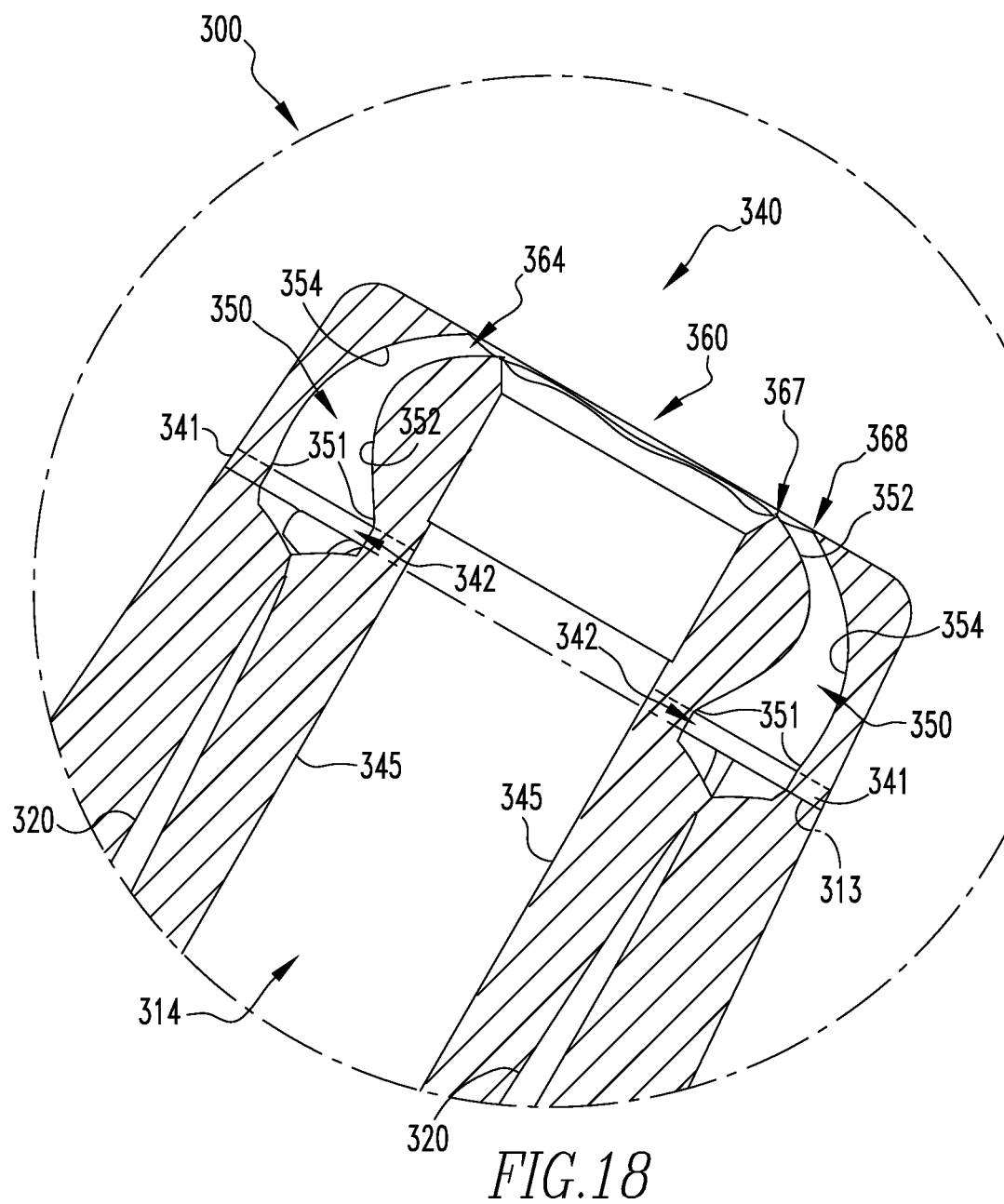
FIG. 18 is an enlarged cross-sectional view of the tool holder (at the circular region denoted by line 18 of FIG. 17) showing portions of the generally ring-shaped nozzle outlet and of the fluid/coolant chamber configured/shaped to direct fluid/coolant flow that is predominantly radially inwardly directed (in relation to the longitudinal central axis) and openings into the fluid/coolant directing structure overlaying and fluidically connected with the feeder channels.

Referring to FIG. 14, in example embodiments, the tool holder 300 further includes a structure 341 at a distally-facing surface 313 of the shank 310. The structure 341 has openings 342 (FIG. 15A) fluidically connected (e.g., overlaying and coaligned as shown) with the feeder channels 320, and the fluid/coolant directing structure 340 is formed/built upon the structure 341 (e.g., utilizing a 3D printing process). The fluid/coolant directing structure 340 includes a fluid/coolant chamber 350 (FIGS. 14 and 18), which is fluidically connected to and distally positioned in relation to the feeder channels 320, a nozzle 360 fluidically connected to the fluid/coolant chamber 350 and a generally ring-shaped nozzle outlet (or nozzle opening) 364 at a distal end 304 of the tool holder 300, the nozzle outlet 364 (continuously) varying in position (e.g., modulating in shape approximately sinusoidally) along an edge or edges thereof (e.g., such as the inner edge 367 and the outer edge 368 formed/shaped as shown, respectively, in this example embodiment) in relation to a longitudinal central axis (denoted "L") of the shank 310 and the fluid/coolant chamber 350 being configured/shaped to correspondingly variably modulate (e.g., along the inner edge 367 and along the outer edge 368, respectively) and direct fluid/coolant flow (exiting the nozzle outlet 364) that is both radially inwardly and longitudinally distally directed in relation to the longitudinal central axis (denoted "L"). In this example embodiment, the inner edge 367 and the outer edge 368 each vary in position (in relation to the longitudinal central axis) approximately sinusoidally moving circumferentially around the nozzle outlet 364 and also vary (radially) in position in relation to each other moving circumferentially around the nozzle outlet 364. Referring also to FIG. 12B, in this illustrated example embodiment, the nozzle outlet 364 is positioned (e.g., circumferentially positioned) about the tool receiving recess 314.

With reference to FIGS. 14-18, in example embodiments, the fluid/coolant chamber 350 includes an inner wall 352 and an outer wall 354 (which at their distal-most portions, define/adjoin the inner edge 367 and the outer edge 368, respectively, of the nozzle outlet 364). In this example embodiment, the inner wall 352 and the outer wall 354 each varying in distance from and in relation to the longitudinal central axis (denoted "L") about (e.g., modulating approximately sinusoidally moving circumferentially around) the fluid/coolant chamber 350 and along (e.g., generally increasing restriction as moving distally along) the fluid/coolant chamber 350 toward the nozzle outlet 364. Referring to FIG. 15B, in example embodiments, the fluid/coolant chamber 350 at a portion thereof (e.g., a ring-shaped reservoir) 351 coaligned (e.g., at concentric inner and outer boundaries of the ring-shaped reservoir) with the feeder channels 320 serves as a nozzle inlet 362 of the nozzle 360, and a ratio of the area of the nozzle inlet over the area across the nozzle 360 at the nozzle outlet 364 is at least 1.0 (e.g., 1-5 or higher, or around 3.3-3.4). In example embodiments, the feeder channels 320 and the fluid/coolant directing structure 340 are configured such that a ratio of the total area across the feeder channels 320 over the area across the nozzle 360 at the nozzle outlet 364 is at least 1.0 (e.g., 1-5 or higher, or around 1.4-2.8).

In example embodiments, the fluid/coolant chamber 350 and the nozzle 360 are integrally formed or otherwise formed or connected together providing the fluid/coolant directing structure 340. In example embodiments, the fluid/coolant directing structure 340 and/or at least a portion of the tool holder 300 includes material from or in the form of one or more 3D printed objects. In example embodiments, the entirety of the tool holder 300, or a portion thereof, is manufactured utilizing a 3D printing, machining, casting or other process.

The feeder channels 320 are (located generally circumferentially in relation to and) substantially evenly spaced (or evenly distributed in respect to flow volume facilitated) about the longitudinal central axis (denoted "L") of the shank 310. The number and arrangement of the feeder channels 320 can differ from the example embodiments described/provided herein.

Thus, in an example embodiment of a tool holder with fluid directing passages, the tool holder includes: a shank including a distal portion and one or more coolant inlets along the shank, the coolant inlets including feeder channels at the distal portion, the distal portion including a tool receiving recess configured/sized to receive a cutting tool therein; and a fluid/coolant directing structure coupled to the distal portion and including one or more nozzles fluidically connected to the feeder channels, the one or more nozzles each including an inner wall and an outer wall configured/shaped to approximately sinusoidally modulate fluid/coolant flow through a nozzle outlet of the one or more nozzles in relation to a longitudinal central axis of the shank and/or direct fluid/coolant flow that is both radially inwardly and longitudinally distally directed in relation to the longitudinal central axis.

While example embodiments have been described herein, it should be apparent, however, that various modifications, alterations and adaptations to those embodiments may occur to persons skilled in the art with the attainment of some or all of the advantages of the subject matter described herein. The disclosed embodiments are therefore intended to include all such modifications, alterations and adaptations without departing from the scope and spirit of the technologies and methodologies as described herein.

What is claimed is:

1. A tool holder with fluid directing passages, the tool holder comprising:
    a shank including a distal portion having feeder channels, the shank including one or more fluid inlets with which the feeder channels are fluidically connected, the distal portion including a tool receiving recess configured/sized to receive a cutting tool therein and including a tool coupling interface portion; and
    a fluid directing structure coupled to the distal portion, the fluid directing structure including a fluid chamber fluidically connected to and distally positioned in relation to the feeder channels, at least one nozzle integrally formed with and fluidically connected to the fluid chamber and a conical radially inwardly angled annular outer surface at a distal end of the tool holder, the nozzle(s) each facing and being configured/shaped to focus and direct fluid flow that is both radially inwardly and longitudinally distally directed in relation to a longitudinal central axis of the shank, wherein:
    the nozzle(s) each include a nozzle inlet fluidically connected to the fluid chamber, a nozzle outlet at the angled annular surface, and a nozzle channel spanning between the nozzle inlet and the nozzle outlet;
    the nozzle channel comprises an inner wall, an outer wall and opposing sidewalls extending between the inner and outer walls; and
    the inner wall, outer wall, and sidewalls are integrally formed with each other.

2. The tool holder of claim 1, wherein the fluid directing structure is configured/formed such that the fluid chamber is a revolved chamber for pressurized fluid.

3. The tool holder of claim 1, wherein for each nozzle, the length radially along the nozzle generally increases and the width transversely across the nozzle generally decreases advancing through the nozzle channel from the nozzle inlet to the nozzle outlet.

4. The tool holder of claim 1, wherein for each nozzle, a ratio of the area across the nozzle at the nozzle inlet over the area across the nozzle at the nozzle outlet is at least 1.0.

5. The tool holder of claim 1, wherein the feeder channels and the fluid directing structure are configured such that a ratio of the total area across the feeder channels over the total area across the nozzle(s) at the nozzle outlet(s) is at least 1.0.

6. The tool holder of claim 1, wherein for each of the nozzles, a shortest angle between a vertex at/defined by the nozzle outlet and the longitudinal central axis is around 60°.

7. The tool holder of claim 1, wherein the fluid directing structure and/or at least a portion of the tool holder includes material from or in the form of one or more 3D printed objects.

8. The tool holder of claim 1, wherein the fluid directing structure includes a plurality of manifolds fluidically connected to and distally positioned in relation to the feeder channels, the nozzle(s) being fluidically connected to the manifolds and the angled annular outer surface at a distal end of the tool holder, the manifolds each having a manifold inlet channel and a plurality of manifold outlet channels configured to substantially evenly distribute/divide fluid flow from the manifold inlet channel as between the manifold outlet channels.

9. The tool holder of claim 8, wherein the manifolds are evenly distributed about a periphery portion of the tool holder.

10. The tool holder of claim 8, wherein the distal end includes an outer periphery and, for each of the manifolds, the manifold outlet channels are sequentially arranged along a path concentrically within the outer periphery.

11. The tool holder of claim 10, wherein the manifolds, at the manifold outlet channels, are interconnected together along the path.

12. The tool holder of claim 8, wherein the plurality of manifolds and the nozzles are integrally formed.

13. The tool holder of claim 8, wherein the plurality of manifolds and/or at least a portion of the tool holder includes material from or in the form of one or more 3D printed objects.

* * * * *